United States Patent
Zhang et al.

(10) Patent No.: US 9,706,599 B1
(45) Date of Patent: Jul. 11, 2017

(54) LONG WIRELESS LOCAL AREA NETWORK (WLAN) PACKETS WITH MIDAMBLES

(71) Applicant: MARVELL INTERNATIONAL LTD., Hamilton (BM)

(72) Inventors: Hongyuan Zhang, Fremont, CA (US); Rohit U. Nabar, Sunnyvale, CA (US); Sudhir Srinivasa, Sunnyvale, CA (US); Raja Banerjea, Sunnyvale, CA (US); Yong Liu, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 111 days.

(21) Appl. No.: 13/689,183

(22) Filed: Nov. 29, 2012

Related U.S. Application Data

(63) Continuation-in-part of application No. 12/841,772, filed on Jul. 22, 2010, now Pat. No. 8,462,863.
(Continued)

(51) Int. Cl.
*H04L 12/28* (2006.01)
*H04W 84/12* (2009.01)
*H04J 11/00* (2006.01)

(52) U.S. Cl.
CPC .................... *H04W 84/12* (2013.01)

(58) Field of Classification Search
CPC . H04W 72/0446; H04W 92/02; H04W 16/14; H04B 7/0617; H04L 27/2602
(Continued)

(56) References Cited

U.S. PATENT DOCUMENTS 7,599,332 B2   10/2009   Zelst et al.
7,742,390 B2    6/2010   Mujtaba
(Continued)

FOREIGN PATENT DOCUMENTS

WO    WO-2012/122119    9/2012

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.
(Continued)

*Primary Examiner* — Charles C Jiang
*Assistant Examiner* — Will Lin

(57) ABSTRACT

A preamble, a first portion of a data payload, a midamble, and a second portion of the data payload of a single data unit are generated. The midamble is to be transmitted subsequent to transmission of the first portion of the data payload and prior to transmission of the second portion of the data payload. The midamble includes an indication of at least one characteristic of the data payload such as an indication of a size of the second portion of the data payload, or whether or not the data payload includes one or more other portions in addition to the first and second portions. A network interface of a communication device is configured to generate the preamble, the first and second portions of the data payload, and the midamble.

21 Claims, 15 Drawing Sheets

Related U.S. Application Data

(60) Provisional application No. 61/565,316, filed on Nov. 30, 2011, provisional application No. 61/576,516, filed on Dec. 16, 2011, provisional application No. 61/585,565, filed on Jan. 11, 2012, provisional application No. 61/228,084, filed on Jul. 23, 2009.

(58) Field of Classification Search
USPC .................................. 370/328, 338, 329, 389
See application file for complete search history.

(56) References Cited

U.S. PATENT DOCUMENTS

| | | | |
|---|---|---|---|
| 8,126,090 B1 | 2/2012 | Nabar | |
| 8,144,647 B2 | 3/2012 | Nabar et al. | |
| 8,155,138 B2 | 4/2012 | van Nee | |
| 8,289,869 B2 | 10/2012 | Sawai | |
| 8,437,440 B1 | 5/2013 | Zhang et al. | |
| 8,462,863 B1* | 6/2013 | Zhang et al. | 375/260 |
| 8,526,351 B2 | 9/2013 | Fischer et al. | |
| 8,599,803 B1 | 12/2013 | Zhang et al. | |
| 8,619,907 B2 | 12/2013 | Mujtaba et al. | |
| 8,724,720 B2 | 5/2014 | Srinivasa et al. | |
| 8,867,653 B2 | 10/2014 | Zhang et al. | |
| 8,948,283 B2 | 2/2015 | Zhang | |
| 9,021,341 B1 | 4/2015 | Srinivasa et al. | |
| 2002/0174172 A1* | 11/2002 | Hatalkar | 709/203 |
| 2004/0208253 A1 | 10/2004 | Joo | |
| 2005/0111451 A1* | 5/2005 | Kim | H04L 1/0061 370/389 |
| 2006/0233271 A1 | 10/2006 | Savas et al. | |
| 2006/0268671 A1* | 11/2006 | Coon | H04L 27/2613 370/203 |
| 2007/0153725 A1* | 7/2007 | Waxman | H04W 16/00 370/329 |
| 2009/0022093 A1 | 1/2009 | Nabar et al. | |
| 2009/0022128 A1 | 1/2009 | Nabar et al. | |
| 2009/0060094 A1 | 3/2009 | Jung et al. | |
| 2009/0190547 A1 | 7/2009 | Shi et al. | |
| 2009/0196163 A1 | 8/2009 | Du | |
| 2010/0098146 A1 | 4/2010 | Kim et al. | |
| 2010/0246543 A1* | 9/2010 | Rajkotia | H04L 1/1812 370/338 |
| 2011/0002219 A1 | 1/2011 | Kim et al. | |
| 2011/0002280 A1* | 1/2011 | Davydov | H04L 5/0023 370/329 |
| 2012/0201316 A1 | 8/2012 | Zhang et al. | |
| 2012/0294294 A1 | 11/2012 | Zhang | |
| 2013/0202001 A1 | 8/2013 | Zhang | |
| 2013/0287043 A1* | 10/2013 | Nanda | H04L 29/06068 370/467 |

OTHER PUBLICATIONS

Gunnam, et al., "Multi-Rate Layered Decoder Architecure for Block LDPC Codes of the IEEE 802.11n Wireless Standard," IEEE International Symposium on Circuits and Systems, 2007 (ISCAS 2007), pp. 1645-1648 (2007).

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

"IEEE P802.11nTM/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput, " *The Institute and Electronics Engineers, Inc.*, Sep. 2007.

"IEEE Std. 802.11n TM IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

Park, "Proposed Specification Framework for TGah", *The Institute of Electrical and Electronics Engineers*, doc. No. IEEE 802.11-11/1137r6, (Mar. 2012).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Srinivasa et al., U.S. Appl. No. 13/159,143, filed Jun. 13, 2011.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band, "*The Institute of Electrical and Electronics Engineers, Inc.*, Apr. 2003.

Zhang et al., U.S. Appl. No. 12/730,651, filed Mar. 24, 2010.

IEEE Std 802.11™2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std. 802.11ac/D2.0 "Draft Standard for Information Technology—Telecommunications and information exchange between systems—Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between sys-

(56) References Cited

OTHER PUBLICATIONS tems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

Chen, "Home Network Basis: Transmission Environments and Wired/Wireless Protocols," *Prentice Hall*, pp. 1-26 (Jul. 2003).

De Vegt, "Potential Compromise for 802.11 ah Use Case Document", Institute of Electrical and Electronics Engineers, doc. No. IEEE 802.11-11/0457r0, pp. 1-27 (Mar. 2011).

Hiertz et al., "The IEEE 802.11 Universe," *IEEE Communications Magazine*, pp. 62-70, (Jan. 2010).

Lee et al., "TGaf PHY proposal," *The Institute of Electrical and Electronics Engineers*, doc. No. IEEE 802.11-12/0809r5, pp. 1-43 (Jul. 10, 2012).

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11—yy/xxxxr05, (Jan. 2012).

Park, "Proposed Specification Framework for TGah", *The Institute of Electrical and Electronics Engineers*, doc. No. IEEE 802.11-11/1137r6, pp. 1-13 (Mar. 2012).

Park, "Proposed Specification Framework for TGah", *The Institute of Electrical and Electronics Engineers*, doc. No. IEEE 802.11-11/1137r11, pp. 1-36 (Sep. 2012).

Perahia, et al., "Gigabit Wireless LANs: an overview of IEEE 802.11ac and 80211 ad," ACM SIGMOBILE Mobile Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Taghavi et al., "Introductory Submission for TGah", doc. No. IEEE 802.11-11/0062r0, *Institute for Electrical and Electronics Engineers*, pp. 1-5 (Jan. 14, 2011).

Van Nee et al. "The 802.11n MIMO-OFDM Standard for Wireless LAN and Beyond," Wireless Personal Communications, vol. 37, pp. 445-453 (Jun. 2006).

Vermani, et al. "Preamble Format for 1 MHz," *The Institute of Electrical and Electronics Engineers*, doc. No. IEEE 802.11-11/1482r2, pp. 1-30 (Nov. 2011).

Vermani et al. "Spec Framework Text for PHY Numerology," *The Institute of Electrical and Electronics Engineers*, doc. No. IEEE 802.11-11/1311r0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1 MHz Waveform in Wider BW ", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc No. IEEE 802.11-12/1312r0, pp. 1-22 (Nov. 12, 2012).

U.S. Appl. No. 13/689,223, Zhang, et al., "Long Wireless Local Area Network (WLAN) Packets with Midambles," filed Nov. 29, 2012.

Office Action in U.S. Appl. No. 13/689,223, dated Apr. 9, 2014 (16 pages).

Office Action in U.S. Appl. No. 13/689,223, dated Mar. 17, 2015 (15 pages).

Office Action in U.S. Appl. No. 13/689,223, dated Sep. 11, 2014 (10 pages).

U.S. Appl. No. 13/689,244, Zhang, et al., "Long Wireless Local Area Network (WLAN) Packets with Midambles," filed Nov. 29, 2012.

Office Action for U.S. Appl. No. 13/689,244, dated Jul. 17, 2014 (20 pages).

Office Action for U.S. Appl. No. 13/689,244, dated Feb. 23, 2015 (14 pages).

Notice of Allowance in U.S. Appl. No. 13/689,244, dated May 15, 2015 (12 pages).

\* cited by examiner

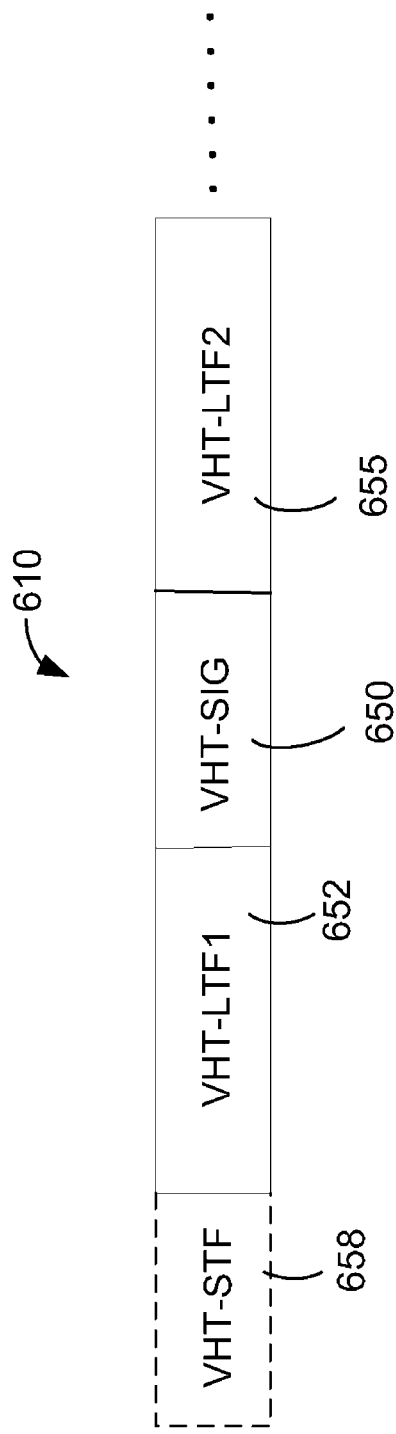

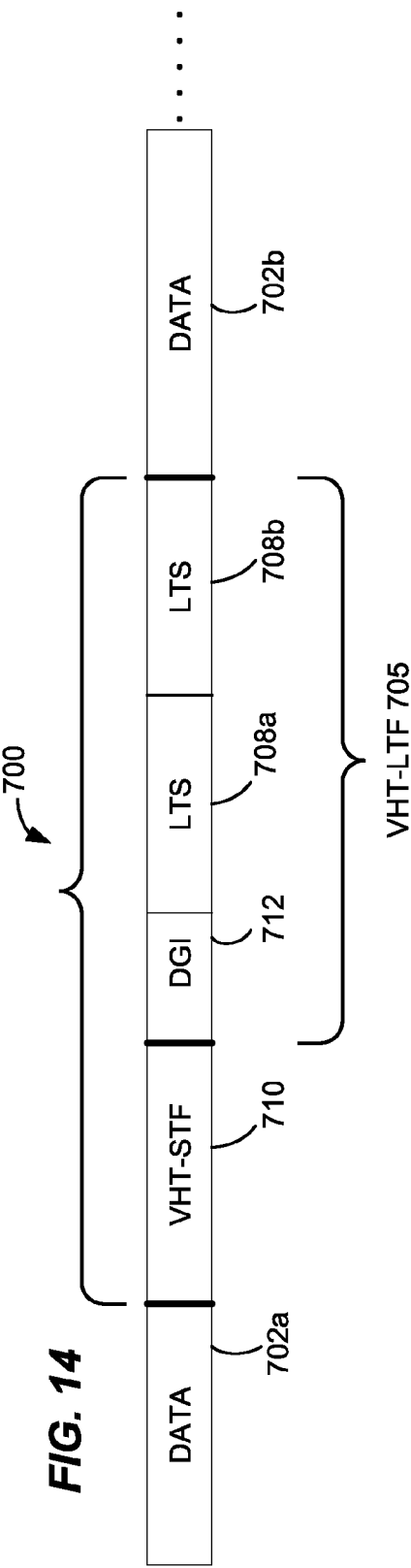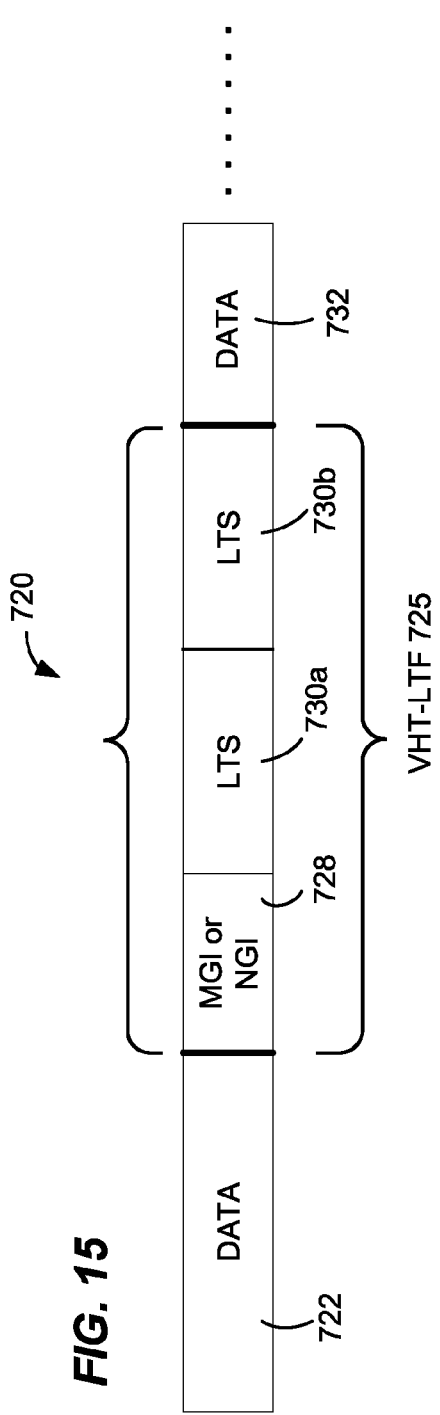

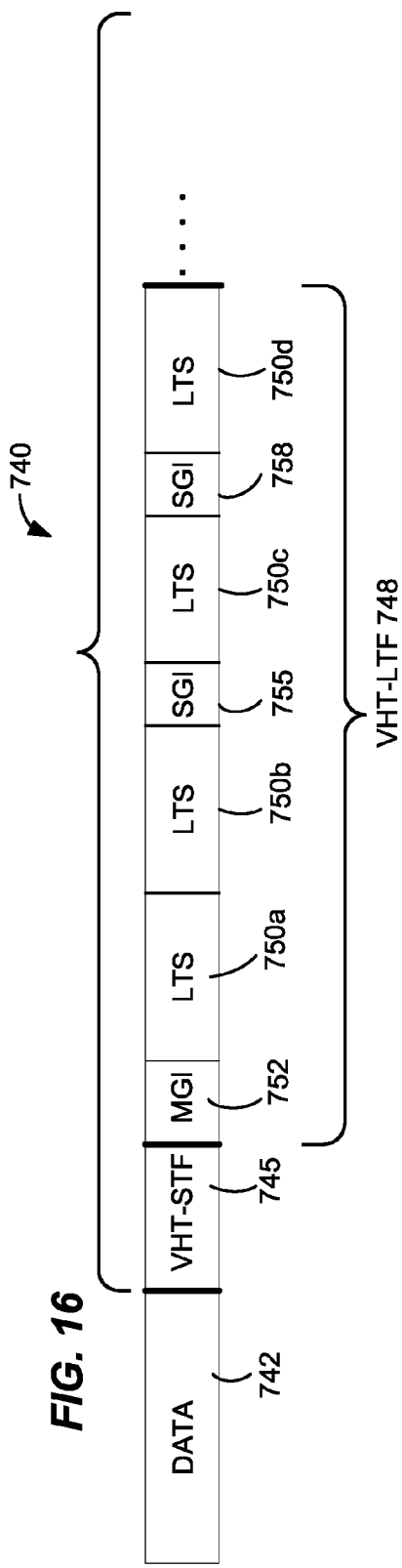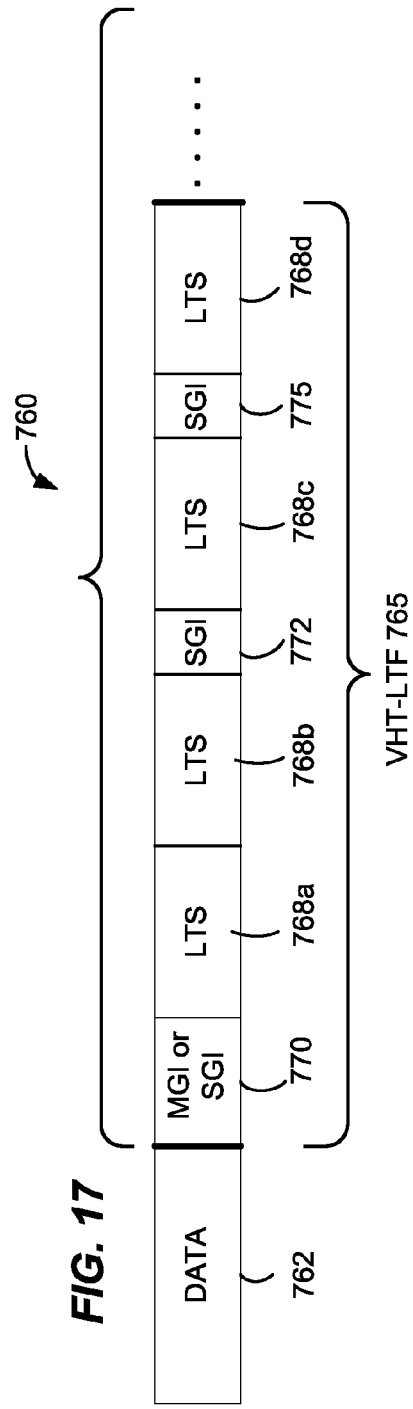

LONG WIRELESS LOCAL AREA NETWORK (WLAN) PACKETS WITH MIDAMBLES

CROSS-REFERENCES TO RELATED APPLICATIONS

The present disclosure is a continuation-in-part of U.S. patent application Ser. No. 12/841,772, entitled "Midamble for WLAN PHY Frames," which was filed on Jul. 22, 2010, which claims the benefit of U.S. Provisional Application No. 61/228,084, entitled "MIMO-OFDM Midamble for Long Packets in WLAN," which was filed on Jul. 23, 2009, the entire disclosures of which are hereby incorporated by reference herein. The present application also claims the benefit of U.S. Provisional Application No. 61/565,316, entitled "MIMO-OFDM Midamble for Long Packets in WLAN," which was filed on Nov. 30, 2011; U.S. Provisional Application No. 61/576,516, entitled "MIMO-OFDM Midamble for Long Packets in WLAN," which was filed on Dec. 16, 2011; and U.S. Provisional Application No. 61/585,565, entitled "MIMO-OFDM Midamble for Long Packets in WLAN," which was filed on Jan. 11, 2012, the entire disclosures of which are hereby incorporated by reference herein.

Additionally, the present disclosure is related to U.S. application Ser. No. 13/689,223, entitled "Long Wireless Local Area Network (WLAN) Packets with Midambles," and U.S. application Ser. No. 13/689,244, entitled "Long Wireless Local Area Network (WLAN) Packets with Midambles," both filed currently herewith, the entire disclosures of which are hereby incorporated by reference herein in their entireties.

FIELD OF TECHNOLOGY

The present disclosure relates generally to communication systems and, more particularly, to wireless local area networks in which data packets having midambles are transmitted and received.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. A new standard, IEEE 802.11ac, currently being developed, promises to provide even greater throughput. Other new standards being developed, such as the IEEE 802.11af and IEEE 802.11ah Standards, provide for, among other things, greater range.

SUMMARY

In one embodiment, a method for signaling characteristics of a single data unit during transmission of the single data unit between a transmitter and a receiver over a communication channel includes generating a preamble of the single data unit, a first portion of a data payload of the single data unit, and a second portion of the data payload of the single data unit. The method also includes generating a midamble of the single data unit, wherein the midamble is to be transmitted subsequent to transmission of the first portion of the data payload and prior to transmission of the second portion of the data payload, and wherein the midamble includes an indication of at least one characteristic of the data payload.

In another embodiment, a communication device comprises a network interface. The network interface is configured to generate a preamble of a single data unit, a first portion of a data payload of the single data unit, and a second portion of the data payload of the single data unit. The network interface is further configured to generate a midamble of the single data unit, where the midamble includes an indication of a size of the second portion of the data payload. Additionally, the network interface is configured to include the midamble between the first portion of the data payload and the second portion of the data payload.

In yet another embodiment, a method for generating a data unit for transmission between a transmitter and a receiver over a communication channel includes generating a preamble of the single data unit, a first portion of a data payload of the single data unit, and a second portion of the data payload of the single data unit. The method further includes generating a midamble of the single data unit, wherein the midamble is to be transmitted after transmission of the first portion of the data payload and prior to transmission of the second portion of the data payload, and wherein the midamble includes an indication of whether or not the data payload includes one or more other portions in addition to the first portion and the second portion.

In still another embodiment, a communication device comprises a network interface. The network interface is configured to generate a preamble of a single data unit, a first portion of a data payload of the single data unit, and a second portion of the data payload of the single data unit. The network interface is further configured to generate a midamble of the single data unit, wherein the midamble includes an indication of whether or not the data payload includes a third portion of the data payload to be transmitted after transmission of each of the first portion and the second portion. Additionally, the network interface is configured to include the midamble between the first portion of the data payload and the second portion of the data payload.

BRIEF DESCRIPTION OF THE DRAWINGS

FIG. 13 is a detailed view of an embodiment of the midamble of FIG. 11.

FIG. 14 is a diagram of a portion of a data unit illustrating an example format of a midamble including a plurality of training symbols, according to an embodiment.

FIG. 15 is a diagram of a portion of a data unit illustrating another example format of a midamble including a plurality of training symbols and excluding any very high throughput short training fields (VHT-STFs), according to another embodiment.

FIG. 16 is a diagram of a portion of a data unit illustrating another example format of a midamble including a segmented set of training symbols, according to another embodiment.

FIG. 17 is a diagram of a portion of a data unit illustrating another example format of a midamble including a segmented set of training symbols and excluding any VHT-STFs, according to another embodiment.

DETAILED DESCRIPTION

In embodiments described below, wireless network devices such as an access point (AP) and client devices of a wireless local area network (WLAN) transmit data streams between the AP and the client devices. To enable receiving devices to properly demodulate data portions of data units, transmitting devices include training fields, generated so as to enable accurate estimation of the MIMO (Multiple-Input Multiple-Output) channel, in the physical layer (PHY) preamble of at least some of the data units. For data units with very long data portions or payloads, or when desired, transmitting devices include training fields in a PHY midamble in at least some of the data units. In particular, a wireless network device transmits a midamble between portions of a data payload of a single data unit, so as to enable accurate estimation or to perform sounding of the MIMO channel during the transmission of the data payload of the single data unit. In an embodiment, the midamble includes signaling information corresponding to one or more portions of the data payload. A device that receives a midamble in a single data unit uses the information included in the midamble to estimate or calibrate to the channel whilst processing portions the data payload of the single data unit.

Figure 1:
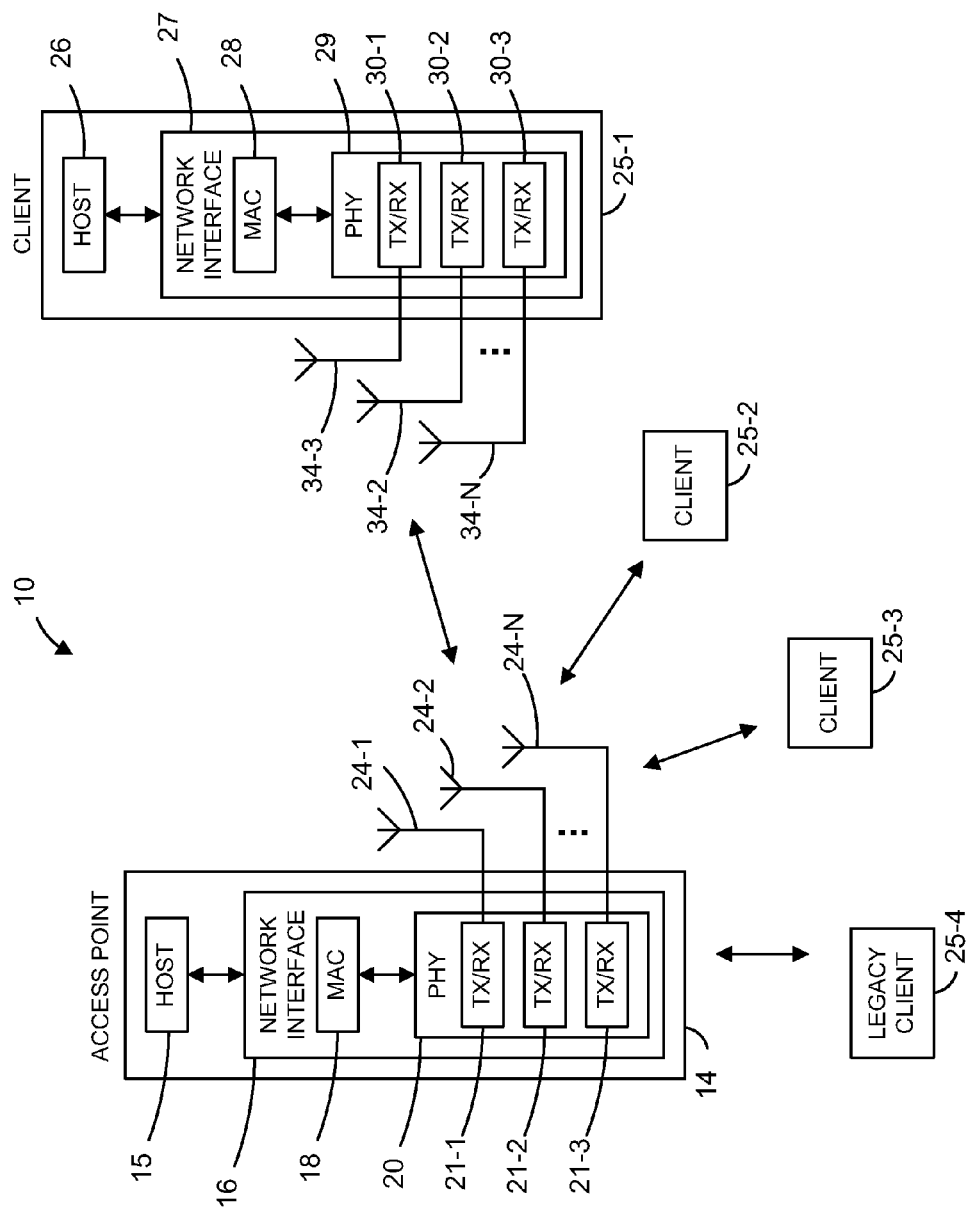
FIG. 1 a block diagram of an example wireless local area network (WLAN) communication system in which devices exchange data units including midambles containing signaling information, according to an embodiment.

FIG. 1 is a block diagram of an example WLAN 10 in which devices such as an AP 14 and client devices 25 exchange information using OFDM (Orthogonal Frequency-Division Multiplexing) techniques in a MIMO mode, according to an embodiment. The AP 14 includes a host processor 15 coupled to a network interface 16. The network interface 16 includes a medium access control (MAC) unit 18 and a physical layer unit 20. The PHY unit 20 includes a plurality of transceivers 21, each associated with a corresponding RF (Radio Frequency) chain (not shown), and the transceivers are coupled to N antennas 24. In general, the AP 14 can include different numbers (e.g., 1, 2, 4, 5, 6, 8, etc.) of transceivers 21 and antennas 24 in other embodiments. In one embodiment, the MAC unit 18 and the PHY unit 20 are configured to operate according to a communication protocol referred to herein as a "midamble communication protocol" or "midamble protocol," which utilizes data units with midambles and is capable of supporting longer data payloads as compared to data units specified by the IEEE 802.11a Standard or the IEEE 802.11n Standard, for example. In some embodiments, the PHY unit 20 is configured to generate and receive data units with midambles. In some embodiments, the MAC unit 18 and the PHY unit 20 are also configured to operate according to communication protocols such as the IEEE 802.11n Standard and/or the IEEE 802.11a Standard in addition to the midamble protocol. As is known, devices that operate according to the IEEE 802.11n Standard support MIMO channels with at most four spatial or space-time streams (referred to hereinafter merely as "space-time streams" for brevity), and devices that operate according to the IEEE 802.11a Standard do not necessarily support MIMO. The IEEE 802.11a Standard is referred to herein as a "legacy protocol" or "legacy communication protocol," and the IEEE 802.11n Standard is referred to herein a "high throughput" (HT) protocol, which is also a legacy communication protocol.

A client device 25-1 includes a host processor 26 coupled to a network interface 27. The network interface 27 includes a MAC unit 28 and a PHY unit 29. The PHY unit 29 includes a plurality of transceivers 30, and the transceivers are coupled to a plurality of antennas 34. Although three transceivers 30 and three antennas 34 are illustrated in FIG. 1, the client device 25-1 can include different numbers (e.g., 1, 2, 4, 5, etc.) of transceivers 30 and antennas 34 in other embodiments. The transceiver(s) 30 is/are configured to transmit data units via the antenna(s) 34. Similarly, the transceiver(s) 30 is/are configured to receive data units via the antenna(s) 34. The PHY unit 29 of the client device 25-1 is configured to process received data units conforming to the midamble communication protocol and having formats described hereinafter, and to determine that such data units conform to the midamble communication protocol, according to various embodiments. As discussed in more detail below, the PHY unit 29 in some embodiments is capable of generating and receiving midambles in PHY data units for re-estimating and/or re-calibrating a MIMO channel during the processing of a long data payload of a single PHY data unit.

In an embodiment, one or both of the client devices 25-2 and 25-3 has a structure the same as or similar to the client device 25-1. In these embodiments, the client devices 25 structured like the client device 25-1 have the same or a different number of transceivers and antennas. For example, the client device 25-2 has only two transceivers and two antennas (not shown), according to an embodiment.

According to an embodiment, the client station 25-4 is a legacy client station, i.e., the client station 25-4 is not enabled to receive and fully decode a data unit that is transmitted by the AP 14 or another client station 25 according to the midamble protocol. Similarly, according to an embodiment, the legacy client station 25-4 is not enabled to transmit data units according to the midamble protocol. On the other hand, the legacy client station 25-4 is enabled to receive and fully decode and transmit data units according to one or several legacy communication protocols, via which channel estimation is conducted once per data unit based on a preamble.

In some scenarios, transmitting devices generate data units that do not include a data payload and that are for "sounding" the MIMO channel. These sounding data units are referred to herein as null- or no-data packets (NDPs). In other scenarios, transmitting devices generate data units that include a preamble portion with information sufficient for estimating a MIMO channel with N>4 space-time streams, and a payload portion for which less than N space-time streams are used (e.g., the preamble includes data training fields and extension training fields, respectively). In other words, these data units "sound" one or several MIMO channel dimensions in addition to the MIMO channel dimensions used to transmit the data unit payload. These data units are referred to herein as "staggered" data units or staggered sounding packets with $N_{STS}$ space-time streams used for data payload transfer and $N_{ESS}$ additional space-time streams being sounded. In still other scenarios, transmitting devices generate data units in which the preamble portions include only fields that are necessary to estimate the space-time streams used to deliver data payload portions of the data units, and do not include fields to sound additional MIMO channel dimensions (sometimes referred to herein as "additional space-time streams").

With respect to preambles and midambles, at least some of the devices operating in the WLAN 10 apply a different vector of a matrix P to each training field to be transmitted in a PHY preamble or midamble. The matrix P, often referred to as a channel training matrix, a channel estimating matrix, a pilot matrix, or a preamble permutation matrix, maps symbols to space-time streams. The space-time streams are then mapped to transmit chains using an antenna map or spatial mapping matrix Q. According to some embodiments, a transmitting device generates several blocks of training fields in a preamble or midamble using a separate matrix P and/or a separate spatial mapping matrix Q for each block. In this manner, the preamble or midamble is generated so as to allow a receiving device to estimate the MIMO channel between the transmitting device and the receiving device, and accordingly demodulate transmitted data payload.

A transmitting device generates and transmits a preamble of a data unit, and channel estimation is performed at a receiving device based on the received preamble. For midamble protocol data units that have long data payloads, or when desired, the transmitting device generates one or more additional blocks of training fields in a midamble that is transmitted between a first portion of a data payload and a second portion of a data payload, wherein the first and second portions of the data payload are part of a single PHY data unit. The midamble may use the same or a different matrix P for each block of the midamble, and the one or more P matrices used in the midamble may be the same or may be different than the one or more P matrices used in the preamble. In this manner, the midamble allows a receiving device to update an estimate or a calibration of the MIMO channel more than one time per data unit. In some embodiments, additional midambles may be interspersed between different, additional data payload portions, which are all part of the same single PHY data unit. Thus, devices according to at least some embodiments of techniques set forth in the present disclosure are capable of communicating data units with relatively long data payloads (as compared to payloads according to the IEEE 802.11a/n Standards), and readjusting or updating characteristics to estimate the channel and to improve channel quality both at the onset of a data unit (e.g., based on the preamble) and during the transmission of the data portion of the data unit (e.g., based on one or more midambles). Additionally, the devices according to at least some embodiments of techniques set forth in the present disclosure are capable of communicating characteristics of various segments of the relatively long data payloads so that the receiving device may properly process the long data payloads.

Depending on the embodiment, every element of a P matrix is either 1 or −1, a suitable integer other than 1 or −1, a complex number such as corresponding to a discrete Fourier transform, etc. Different ranges of values used to define a P matrix are associated with different levels of computational complexity and bandwidth utilization.

Figure 2A:
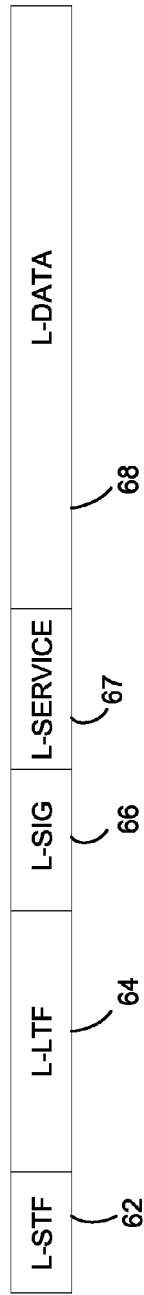
FIG. 2A is a diagram of a prior art data unit format used in a WLAN communication system in which all devices support only a single spatial stream.
Figure 2B:
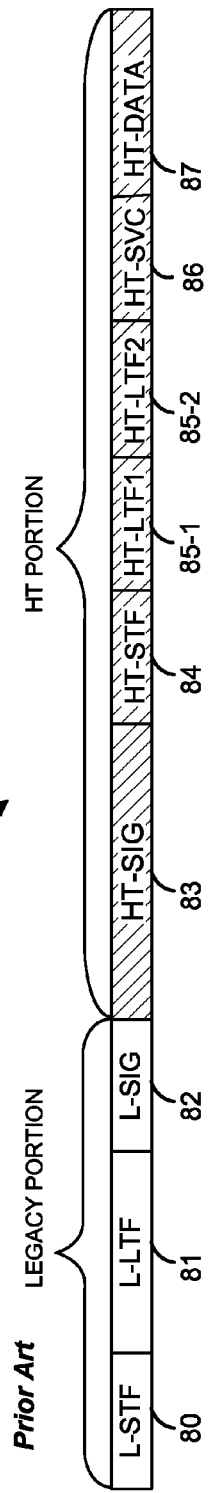
FIG. 2B is a diagram of a prior art data unit format used in a mixed-mode of operation in a WLAN communication system in which some devices support only a single spatial stream, and other devices support at least two spatial or space-time streams.
Figure 2C:
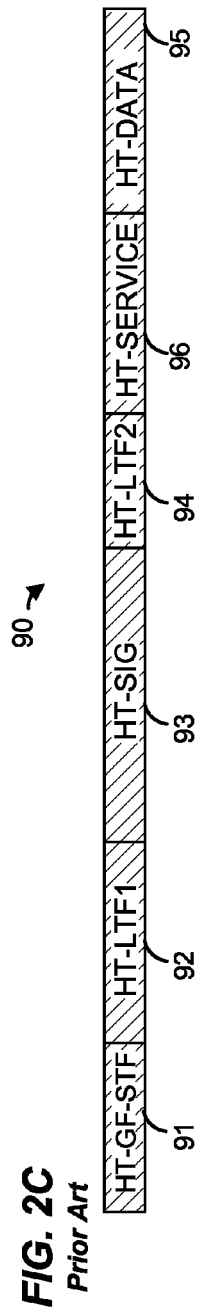
FIG. 2C is a diagram of a prior art data unit format used in a WLAN communication system in which all devices support at least two spatial or space-time streams.

To better explain the formats of data units used by devices in the WLAN 10 or a similar communication network that supports the midamble protocol according to embodiments of the present disclosure, FIGS. 2A-C illustrate several prior art formats of data units consistent with legacy communication protocols. In the formats of FIGS. 2A-C, a short training field (STF) is used for packet detection, automatic gain control (AGC), synchronization, etc.; a long training field (LTF) is used for channel estimation and fine synchronization; a signal field (SIG) is used for signaling basic PHY parameters to receiving devices; a service field (SERVICE) includes reserved bits that can be used for signaling and/or synchronization; and a data payload field (DATA), when included, is used to communicate payload data to the receiving devices. The SIG field generally includes a modulation and coding scheme (MCS) sub-field, and the information in the DATA field is modulated and encoded in accordance with the modulation and the encoding indicated by the MCS sub-field. In some embodiments, the SERVICE field is a sub-field of the DATA field, e.g., an initial number of bytes of the DATA field.

FIG. 2A is a diagram of a prior art data unit 60 that the legacy client station 25-4 is configured to transmit to the AP 14 via OFDM modulation, in an embodiment. The data unit 60 conforms to the IEEE 802.11a Standard and occupies a 20 Megahertz (MHz) band. The data unit 60 includes a preamble having a legacy short training field (L-STF) 62, a legacy long training field (L-LTF) 64, a legacy signal field (L-SIG) 66, and a legacy service field (L-SERVICE) 67. The data unit 60 also includes a data payload or portion 68.

FIG. 2B is a diagram of a prior art OFDM data unit 78 that the legacy client station 25-4 is configured to transmit to the AP 14 using two space-time streams for a data portion, according to an embodiment. The data unit 78 conforms to the IEEE 802.11n Standard, occupies a 20 MHz band, and is designed for mixed mode situations, i.e., when the WLAN includes one or more client stations that conform to the IEEE 802.11a Standard but not to the IEEE 802.11n Standard. The data unit 78 includes a legacy preamble portion having an L-STF 80, an L-LTF 81, and an L-SIG 82. The data unit 78 also includes a high-throughput portion (shaded for clarity of illustration) having a high throughput SIG (HT-SIG) field 83, a high throughput short training field (HT-STF) 84, two data high throughput long training fields (HT-LTFs) 85-1 and 85-2, a high-throughput service field (HF-SVC) 86, and a data payload or portion 87.

FIG. 2C is a diagram of a prior art OFDM data unit 90 that the legacy client station 25-4 is configured to transmit to the AP 14 using two space-time streams for a data portion, according to an embodiment. The data unit 90 conforms to the IEEE 802.11n Standard, occupies a 20 MHz band, and is designed for "Greenfield" situations, i.e., when the WLAN does not include any client stations that conform to the IEEE 802.11a Standard but not to the IEEE 802.11n Standard. The data unit 90 includes a preamble having a high throughput Greenfield short training field (HT-GF-STF) 91, a first high throughput long training field (HT-LTF1) 92, a high-throughput signal field (HT-SIG) 93, the second high throughput long training field (HT-LTF2) 94, a data payload or portion 95, and a high-throughput service field (HT-SERVICE) 96.

It is noted that a length of the data portion of each of the above data units discussed in FIGS. 2A-2C may be variable based on factors such as data length, standards compatibility and/or type of encoding. For example, for a legacy compatible data unit, a number of octets included in the data portion may range from zero to 4095 octets, and for a high throughput compatible data unit using BCC (Binary Convolutional Codes) encoding, a number of octets included the data portion may range from zero to 65,535, where a length of zero indicates a null data packet or "NDP."

For a data unit that conforms to a midamble protocol, such as the IEEE 802.11ac Standard according to an embodiment, and that includes a very long data payload or portion (e.g., greater than 65,535 octets), and/or is used in situations such as when a channel is particularly noisy or in other similar situations, refining channel calibration more than once during the reception of the single data unit may be beneficial. Accordingly, one or more midambles are included within the data portion of the data unit, i.e., each midamble is adjacent to data from the payload at both the beginning of the midamble and the end of the midamble. Each midamble includes one or more OFDM symbols that include calibration information, at least a portion of which may be used for one or more of retraining AGC, channel training or estimation, refining frequency synchronization or carrier frequency offset (CFO), calculating a steering matrix or other parameters used in beamforming, adapting to the link, sounding, etc. In an embodiment, a midamble also includes signaling to communicate one or more characteristics the data payload of a data unit so that a receiver may properly process the data unit. Embodiments of midambles described herein may have particular applicability to systems in which a data packet or data unit duration is longer than durations of channel coherence, such as in wireless systems that use longer wavelengths. Such a data packet is interchangeably referred to herein as a "long data packet," or "long data unit."

Figure 3:
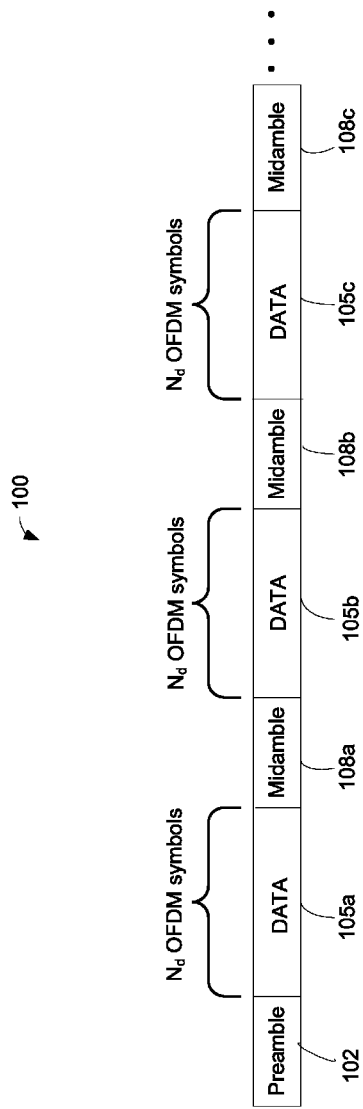
FIG. 3 is a diagram of an example format of a single data unit that includes midambles and is used in a WLAN communication system in which some devices support at least two spatial or space-time streams, according to an embodiment.

To illustrate, FIG. 3 is a diagram of an embodiment of a single OFDM data unit 100. The single data unit 100 includes a preamble 102 and a partitioned data payload comprising portions 105 between which are located midambles 108. The preamble 102 has a format suitable for use in WLANs, according to an embodiment. In one example, the preamble 102 has a format that is compatible for use in a WLAN that includes one or more client stations that support long data units. Although three midambles 108a, 108b, 108c are illustrated in FIG. 3, in other embodiments and/or scenarios, there may be a different number of midambles, such as one, two, four, five, six, etc.

Each midamble 108 includes one or more OFDM symbols, and each midamble 108 is included at every $N_d$ OFDM symbols of the data portion 105, where $N_d$ is an integer. In this manner, the data portion is divided into equally-sized portions 105 (e.g., 105a, 105b, 105c). In some embodiments, though, at least two portions of the data payload differ in size, e.g., data payload portion 105a has $N_{d1}$ symbols and is data portion 105c has $N_{d2}$ symbols, where $N_{d1}$ and $N_{d2}$ are not equal.

According to an embodiment, each midamble 108 has a format generally similar to the preamble 102 (e.g., a VHT-STF, one or more VHT-LTFs, a VHT-SIG, and a VHT-SERVICE), however, typically each midamble 108 has a format corresponding to a subset (either in form, values, size, and/or some other characteristic) of the preamble 102. For example, each midamble 108 may correspond to only a VHT-STF, to a portion of the VHT-STF, to a subset of one or more VHT-LTFs as compared to the preamble 102, or to a portion of one or more the VHT-LTFs of the preamble. Additionally or alternatively, each midamble 108 includes one or more other fields corresponding to other "non-training" fields of the preamble, such as the VHT-SIG field or a portion thereof, the VHT-SERVICE field or a portion thereof, or other fields that are not used for channel training and do not include any short or long channel training data or information. The one or more non-training fields include signaling information that identifies characteristics of the data payload or characteristics of one or more portions of the data payload, in an embodiment.

As the format of each midamble 108 generally corresponds to the format of the preamble 102 or subset thereof, according to an embodiment, a mathematical model that describes the generation of the PHY preamble 102 is briefly considered to provide context for a subsequent discussion describing the generation of each PHY midamble 108. In an embodiment, a training field VHT-LTF of the preamble 102 is defined as a finite sequence of values (e.g., "1, 1, −1, −1, 1, . . . 1, 1"). For each sub-carrier used in the OFDM mode, an instance of the VHT-LTF, in a block m of one or more VHT-LTFs, is mapped to a set of space-time streams using a matrix P which, in some embodiments, is defined separately for each block of one or more VHT-LTFs. Each block is thus used to train or estimate a certain number of space-time streams. For example, if data is transmitted via six space-time streams (i.e., $N_{STS}=6$), and the VHT-LTFs are grouped into a first block $m_1$ of four VHT-LTFs and a second block $m_2$ of two VHT-LTF, matrices $P_{VHTLTF}^{M1}$ for block $m_1$ and $P_{VHTLTF}^{M2}$ for block $m_2$ can be defined as $$P_{VHTLTF}^{M1} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}, P_{VHTLTF}^{M2} = \begin{bmatrix} 1 & 1 \\ 1 & -1 \end{bmatrix}$$

It is noted that, in this embodiment, each of the matrices $P_{VHTLTF}^{M1}$ and $P_{VHTLTF}^{M2}$ is a Hadamard matrix. In an embodiment, $P_{VHTLTF}^{M1}$ and $P_{VHTLTF}^{M2}$ are portions of a larger matrix P. It is further noted that the use of the matrix P in the preamble 102 results in training or estimating every sub-carrier for every space-time stream.

In one such embodiment, a matrix P used for eight VHT-LTFs has eight rows and eight columns. In an embodiment, each element of P is +1 or −1. In another embodiment, each element of P is a complex number (e.g., a Discrete Fourier Transform matrix is used as P). In another embodiment, some elements of P are suitable integers other than +1 or −1.

As each VHT-LTF in one of the blocks is generated, a separate column of the corresponding matrix P is used to map the values to space-time streams. For example, the first column of the matrix $P_{VHTLTF}^{M1}$ is applied to each value in the sequence defining the first instance of VHT-LTF of the block $m_1$, the second column of the matrix $P_{VHTLTF}^{M1}$ is applied to each value in the sequence defining the second instance of VHT-LTF of the block $m_1$, etc. In an embodiment, each instance of VHT-LTF is an OFDM symbol. Similarly, the first column of the matrix $P_{VHTLTF}^{M2}$ is applied to each value in the sequence defining the first instance of VHT-LTF of the i block $m_2$, and the first column of the matrix $P_{VHTLTF}^{M2}$ is applied to each value in the sequence defining the second instance of VHT-LTF of the block $m_2$.

In at least some of the embodiments, a frequency-domain Cyclic Delay Diversity (CDD) matrix D is applied to each of the resulting space-time streams of the OFDM-MIMO channel to avoid undesirable beamforming effects, for example. Application of the CDD matrix is equivalent to introducing linear phase shifts over different sub-carriers of OFDM in at least some embodiments. In an embodiment, separate matrices $D_{M1}$ and $D_{M2}$ are used for each of the blocks $m_1$ and $m_2$, as well as for one or several short training fields VHT-STFs and the data portion of the data unit, if included.

The space-time streams are then mapped to transmit chains of the transmitting device, each of which is associated with a corresponding transmit antenna. In general, the number of transmit antennas $N_{TX}$ is greater than or equal to the number of space-time streams $N_{STS}$. In some embodiments, separate spatial mapping matrices $Q_{M1}$ and $Q_{M2}$ are defined for the blocks $m_1$ and $m_2$. In an embodiment, the matrices $Q_{M1}$ and $Q_{m2}$ are portions of a matrix Q that has $N_{TX}$ columns (i.e., as many columns as transmit antennas), with each row corresponding to a space-time stream. To continue with the example introduced above, in the $N_{STS}=6$ configuration with two blocks of 4 and 2 VHT-LTFs respectively, the overall matrix Q has $N_{TX}$ rows and $N_{STS}$ columns, $Q_{M1}$ corresponds to the first four columns of Q, and $Q_{M2}$ corresponds to the last two columns of Q.

In general, a MIMO channel between a transmitting device equipped with $N_{TX}$ transmit antennas (and, therefore, $N_{TX}$ transmit chains) and a receiving device equipped with $N_{Rx}$ receive antennas can be represented by a matrix H having $N_{Rx}$ rows and $N_{TX}$ columns. In the example considered above, a device receives the signal s(k) transmitted in the blocks $m_1$ and $m_2$ over the channel $H^k$ associated with a carrier k, $N_{Rx}$ receive antennas, and $N_{TX}$ transmit antennas as:

$$x_{m1}^k = H^k Q_{1:N_{TX},1:N_{STS\_M1}}^k D_{N_{STS}}^k P_{1:N_{STS\_M1},1:N_{VHTLTF}} s(k) \text{ and} \quad \text{Equation 1}$$

$$x_{m2}^k = H^k Q_{1:N_{TX},N_{STS\_M1}+1:N_{STS\_M1}+N_{STS\_M2}}^k \quad \text{Equation 2}$$
$$D_{N_{STS\_M2}}^k P_{1:N_{STS\_M2},1:N_{VHTLTF}} s(k)$$

where $N_{STS\_M1}$ is the number of space-time streams trained or estimated in the block $m_1$, $N_{STS\_M2}$ is the number of space-time streams trained or estimated in the block $m_2$. In Equations 1 and 2, the notation $X_{M:N}$ indicates a matrix consisting of columns M through N of matrix X.

Thus, the receiving device can use the two received signals, each corresponding to a respective block of training fields VHT-LTFs, to generate estimates $H_{EST\_m1}^k$ and $H_{EST\_m2}^k$ of portions of the channel that can be combined to generate an estimate $H_{EST}^k$ of the channel $H^k$:

$$H_{EST}^k = [H_{EST\_M1}^k H_{EST\_M2}^k] \quad \text{Equation 3}$$

In particular, the matrix P (or the corresponding block-specific matrices) is applied to the signal associated with a preamble to train the receiving device, the receiving device inverts the matrix P when the signal x is received to estimate the channel H. Thus, upon undoing the frequency domain transformation corresponding to the CDD matrix D, the estimated channel $H_{EST}^k$ on the carrier k is given by:

$$H_{EST}^k = \lfloor H^k Q_{1:N_{TX},1:N_{STS\_M1}}^k H^k \quad \text{Equation 4}$$
$$Q_{1:N_{TX},1:N_{STS\_M1}+1:N_{STS\_M1}+N_{STS\_M2}}^k \rfloor = H^k Q^k$$

Turning back to FIG. 3, a format of each midamble 108 generally corresponds to a format of the preamble 102 or a subset of the format of the preamble 102, in some embodiments, as follows. Generally, a training signal (e.g., signal used for channel estimation) or pilot $P_{i_{STS},n}^{(k)}$ is transmitted on the k-th sub-carrier for the n-th OFDM training symbol at the $i_{STS}$-th space-time stream. The pilots or training signals across all space-time streams and sub-carriers of the channel are spread over time and frequency using a channel training or pilot matrix $P^{(k)}$, where k is an index of the k-th sub-carrier or group of carriers. Thus, in one embodiment, the format of each midamble 108 is expressed as $P^{(k)}s(k)$, where s(k) is the OFDM training symbol at the k-th sub-carrier. It should be noted that each different midamble 108 within a single data unit 100 need not (but in some cases, may) have the same format. The pilot matrix $P^{(k)}$ of each midamble 108 is not constrained to only the examples discussed herein. For example, in other embodiments, the pilot matrix $P^{(k)}$ is a suitable matrix such as a unitary/orthogonal matrix. Furthermore, although not shown in FIG. 3, in some embodiments, the lengths of the data portions 105 are not equivalent. For example, two or more of the data portions 105 have different lengths in some embodiments and/or scenarios.

In some embodiments of the single data unit 100, the preamble 102 includes an indication that one or more midambles 108 are included in the single data unit 100. The indication may be included in the VHT-SIG field or in some other suitable field of the preamble 102. In one embodiment, the indication is a subfield of the preamble 102 and also indicates a position or location of a midamble within the data payload portion. The subfield corresponds to the value $N_d$ shown in FIG. 3, in the example having equally-sized portions of the data payload. In another embodiment, if a location of the midamble or midambles is fixed within the data unit 100, the indication is a flag, bit or other indicator in the preamble 102 that signals the existence of a single midamble, or the indication is an indication of the number of midambles that are included in the single data unit 100, but the location(s) of the midamble(s) is (are) assumed (i.e., predetermined). For example, a communication protocol defines fixed locations for midambles, in one embodiment.

Figure 4:
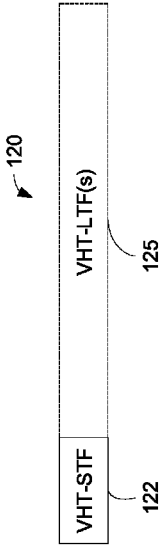
FIG. 4 is a diagram of an example generalized format of a midamble, according to an embodiment.

FIG. 4 is a diagram of an example generalized format of a midamble 120, such as one of the midambles 108 of FIG. 3. The midamble 120 includes a VHT-STF field 122 and one or more VHT-LTF fields 125. The VHT-STF field 122 and the VHT-LTF field(s) 125 may be of a similar format as corresponding VHT-STF and VHT-LTF fields in the preamble 102 of the single data unit 100. The dashed lines indicate that, in some embodiments, only the VHT-STF 122 is included in the midamble 120 (i.e., the VHT-LTF(s) are omitted), such as when automatic gain control retraining or synchronization is desired. In some embodiments, less than all (e.g., only one) or all of the VHT-LTF fields 125 are included in the midamble 120, such as when channel training, channel estimation, or finer synchronization is desired. In the following sections, the disclosure will refer back to the generalized format of the midamble 120 illustrated in FIG. 4 for explanatory purposes.

If, for a particular single data unit, every sub-carrier is desired to be trained or estimated for every space-time stream as in the preamble 102, then $P^{(k)}$ of a particular midamble of the single data unit is equivalent to $P^{(k)}$ of the preamble 102. For example, when a number of space-time streams $N_{STS}=2$, and every sub-carrier is trained or estimated for every space-time stream, then the particular midamble may be expressed as:

$$P^{(k)} = \begin{bmatrix} 1 & 1 \\ 1 & -1 \end{bmatrix} e^{j\theta_k} \qquad \text{Equation 5}$$

In this example, the format of the midamble is equivalent to the format of the preamble of the particular single data unit.

Figure 5:
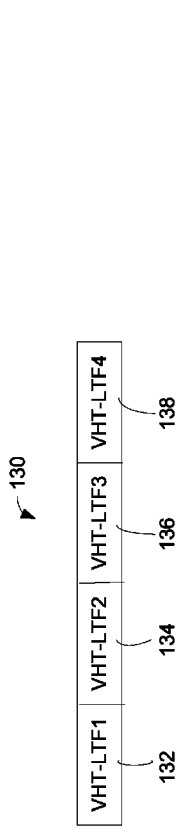
FIG. 5 is a diagram of an example format of a midamble, according to an embodiment.

In another example illustrating the format of a midamble being equivalent to the format of a preamble, consider a case where a number of space-time streams $N_{STS}=4$ and every sub-carrier is desired to be trained or estimated for every space-time stream. In this example, the midamble is of the generalized format 120 of FIG. 4, and a detailed view of an example VHT-LTF field 125 is shown in FIG. 5, in accordance with an embodiment. For the example VHT-LTF field 130 of FIG. 5, a VHT-LTF 132 is for a first space-time stream, a second VHT-LTF 134 is for a second space-time stream, a VHT-LTF 136 is for a third space-time stream, and a VHT-LTF 138 is for a fourth space-time stream.

Returning to FIG. 4, in some cases, channel calibration based on a midamble does not need to be as comprehensive as channel calibration based on the preamble. Smaller channel adjustments and/or channel adjustments at a slower rate may be acceptable or even desired during the transmission of the data payload, so the format of the midamble need not be as robust as the format of the preamble. In these cases, information for training or channel estimating may be interleaved across sub-carriers (tone interleaving) and/or may be interleaved across space-time streams (space-frequency interleaving) so that not every sub-carrier is trained or estimated for every space-time stream. In particular, if a subset of sub-carriers and/or a subset of space-time streams is desired to be trained or estimated, then a format of $P^{(k)}$ of a midamble is a subset of the format of $P^{(k)}$ of the preamble 102, in an embodiment.

Tone interleaving allows a subset of sub-carriers to be trained or estimated across space-time streams. For tone interleaving, the values of $P^{(k)}$ of a midamble are a subset of the values of $P^{(k)}$ of the preamble 102, in an embodiment. In one example, if a maximum number of space-time streams $N_{STS}=2$, and every other sub-carrier is trained or estimated for a particular space-time stream, then the midamble of a single data unit is expressed as:

$$P^{(k)} = \begin{bmatrix} 1 \\ 0 \end{bmatrix} e^{j\theta_k}, \; P^{(k+1)} = \begin{bmatrix} 0 \\ 1 \end{bmatrix} e^{j\theta_{k+1}}, \; P^{(k+2)} = \begin{bmatrix} 1 \\ 0 \end{bmatrix} e^{j\theta_{k+2}}, \ldots, \qquad \text{Equation 6}$$

so that a single VHT-LTF symbol is used to train or estimate two space-time streams, e.g., the single symbol is interleaved across two space-time streams, in an embodiment. Accordingly, for each tone or sub-carrier k, the values and the sizes of the midamble $P^{(k)}$ as expressed in Equation 6 are a subset of the values and sizes of the preamble $P^{(k)}$ expressed in Equation 5, in an embodiment. Referring to FIG. 4 with respect to this embodiment, the VHT-LTF field 125 of the midamble 120 corresponds to the matrix P of Equation 6. Of course, this embodiment of tone interleaving is not limited to only $N_{STS}=2$ and to two symbols, as any number of symbols may be used to train any number of space-time streams.

In another embodiment of tone interleaving, a subset of sub-carriers is trained or estimated across space-time streams, but by use of a maximal number of VHT-LTF fields. In an example, if $N_{STS}=2$, and every other sub-carrier is trained or estimated for every space-time stream, then:

$$P^{(k)} = \begin{bmatrix} 1 & 0 \\ 0 & 1 \end{bmatrix} e^{j\theta_k}, \; P^{(k+1)} = \begin{bmatrix} 0 & 1 \\ 1 & 0 \end{bmatrix} e^{j\theta_{k+1}}, \qquad \text{Equation 7}$$

$$P^{(k+2)} = \begin{bmatrix} 1 & 0 \\ 0 & 1 \end{bmatrix} e^{j\theta_{k+2}}, \ldots,$$

Accordingly, for each tone or sub-carrier, the values of Equation 7 are a subset of the values of $P^{(k)}$ of the preamble 102 expressed in Equation 5, in an embodiment. Referring to FIG. 4 with respect to this embodiment, the VHT-LTF field 125 of the midamble 120 corresponds to the matrix P of Equation 7. Of course, this embodiment of tone interleaving is not limited to only $N_{STS}=2$ and to two symbols, as any number of symbols may be used to train or estimate any number of space-time streams.

Figure 6:
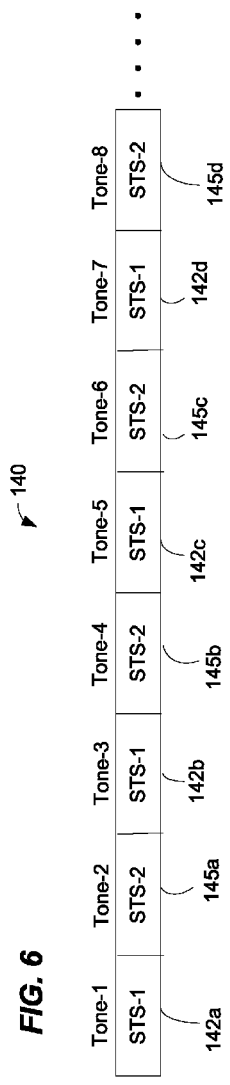
FIG. 6 is a diagram illustrating an example of space-frequency interleaving, according to an embodiment.

Space-frequency interleaving allows one OFDM symbol in a midamble to be interleaved over all space-time streams over all sub-carriers. A pictorial representation of one embodiment of space-frequency interleaving is illustrated in FIG. 6. In FIG. 6, which illustrates an example mapping 140 of training signals to sub-carriers or tones, according to an embodiment, the maximum number of space-time streams $N_{STS}$=2. A first tone 142a (i.e., k=1) is a training signal for a first space-time stream; a second tone 145a (i.e., k=2) is a training signal for a second space-time stream; a third tone 142b (i.e., k=3) is a training signal for the first space-time stream; a fourth tone 145b (i.e., k=4) is a training signal for the second space-time stream; and so on as illustrated by references 142c, 145c, 142d and 145d. The $N_{STS}$-th (or $N_{STS+1}$-th tone, in the case of an even/odd discrepancy between $N_{STS}$ and the maximum number of tones) is a training signal for the $N_{STS}$-th space-time stream. Thus, in space-frequency interleaving, a subset of the tones of the of preamble $P^{(k)}$ as represented by Equation 5 is transmitted for each space-time stream at a particular instance in time, and the $N_{STS}$ space-time streams are trained or estimated continuously over all subsequent tones with one OFDM symbol. In an example, each space-time stream is separately trained at a different instance in time with a different sub-carrier of the OFDM symbol until, over time, every space-time stream has been trained with every different sub-carrier. Of course, other embodiments of space-frequency interleaving may include more than one OFDM symbol used for training and/or may have a different maximum number of space-time streams.

In some embodiments, a midamble (such as the one or more midambles 108 shown in FIG. 3) is used for sounding after transmission of the preamble and during the transmission of the data payload of a single data unit or packet. In one example, midamble-based sounding during the transmission of a data payload is enabled or performed when an updated channel estimate is desired at a beamformee, when feedback is to be provided to a beamformer, or when link adaptation is desired. In some embodiments, the format of a sounding midamble is represented by the midamble 120 of FIG. 4, with the VHT-LTF(s) 125 formatted in an NDP (Null Data Packet) sounding frame format similar to that used in a preamble 102. In other embodiments, the VHT-LTF(s) 125 of a sounding midamble are defined in a staggered sounding format that includes both data and extension VHT-LTF(s), such as described in U.S. patent application Ser. No. 12/790,158 filed on May 28, 2010, and entitled "PHY Frame Formats in a System with More than Four Space-Time Streams," the entire disclosure of which is hereby incorporated by reference herein.

In some embodiments, sounding midambles are tone interleaved. For instance, for a sounding midamble with a staggered sounding format, tone interleaving is defined separately in the data VHT-LTF(s) and the extension VHT-LTF(s). In the case of a sounding midamble with an NDP format, tone interleaving is defined only in the data portion of the VHT-LTF(s).

The presence of a sounding midamble in a data unit is signaled in the preamble 102 of a data unit 100, such as by a bit, flag or other indicator, in some embodiments. Additionally or alternatively, a position of a sounding midamble may be indicated in the preamble 102, in some embodiments. The indicator(s) of one or more sounding midamble(s) may be the same as or different from the indicator(s) of other types of midambles. One or more sounding midambles may be included in a single data unit 100, but a single data unit 100 is not required to include any sounding midambles. In some embodiments, the presence and/or position of a subsequent sounding midamble is indicated in a midamble included in the data unit prior to the subsequent sounding midamble.

Figure 7:
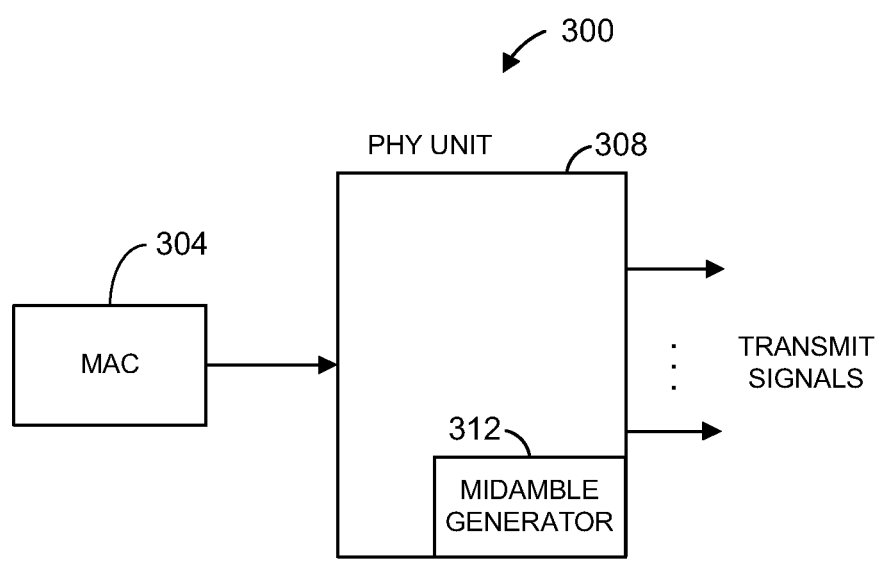
FIG. 7 is an embodiment of block diagram of an example subsystem of a network interface, according to an embodiment.

FIG. 7 is a block diagram of an example subsystem 300 of a network interface that is utilized in the network interface 16 and/or the network interface 27, according to an embodiment. The subsystem 300 is configured to generate midambles, such as described herein, for inclusion in data units.

A media access control (MAC) unit 304 corresponding to a client device (sometimes referred to herein as a "user") provides a data stream to a PHY unit 308. The PHY unit 308 is configured to generate PHY data units, payloads for data units, and one or more midambles for inclusion in the payload of each of at least some data units, and to generate one or more transmit signals including the one or more midambles. The one or more transmit signals are provided to a transceiver (not shown) for transmission via one or more transmit antennas (not shown), according to an embodiment.

In some embodiments, the single space-time stream is one of a plurality of space-time streams generated by the PHY unit 308, and the PHY unit 308 also orthogonally multiplexes data for the multiple client devices on the one or more other space-time streams.

In some embodiments, the subsystem 300 may be configured to orthogonally multiplex data for multiple client devices onto a single space-time stream without using channel state information (CSI), such as described in U.S. patent application Ser. No. 12/772,783 filed on May 3, 2010 and entitled "Open Loop Multiple Access for WLAN," the entire disclosure of which is hereby incorporated by reference. In one example, the MAC unit 304 may include a plurality of MAC sub-units corresponding to different client devices or users, where each MAC sub-unit provides an independent data stream to the PHY unit 308. In another example, the MAC unit 304 may generate separate MAC protocol data units (MPDUs) corresponding to different client devices and aggregate the separate MPDUs into an aggregated MPDU (A-MPDU) which is provided to the PHY unit 308.

The PHY unit 308 includes a midamble generator 312 to generate one or more midambles of a PHY data unit, where each midamble includes one or more OFDM symbols that include calibration information for estimating or sounding at least a portion of the communication channel. The midamble generator 312 is configured to generate the one or more OFDM symbols in accordance with embodiments of the methods and systems described herein. In one example, the midamble generator 312 generates more than one midamble for a particular single data unit. In other examples, the midamble generator 312 generates different sets of pilot coefficients for tone interleaving, or generates different OFDM symbols for space-time interleaving. In some embodiments, the midamble generator 312 is a same entity as a preamble generator (not shown), such as the preamble generator described in aforementioned U.S. patent application Ser. No. 12/790,158. Generally, but not necessarily, the midamble generator 312 may operate in accordance with a preamble generator to include, in the preamble of a particular single data unit, an indication of an existence and/or of a location of the midamble in the single data unit.

Figure 8:
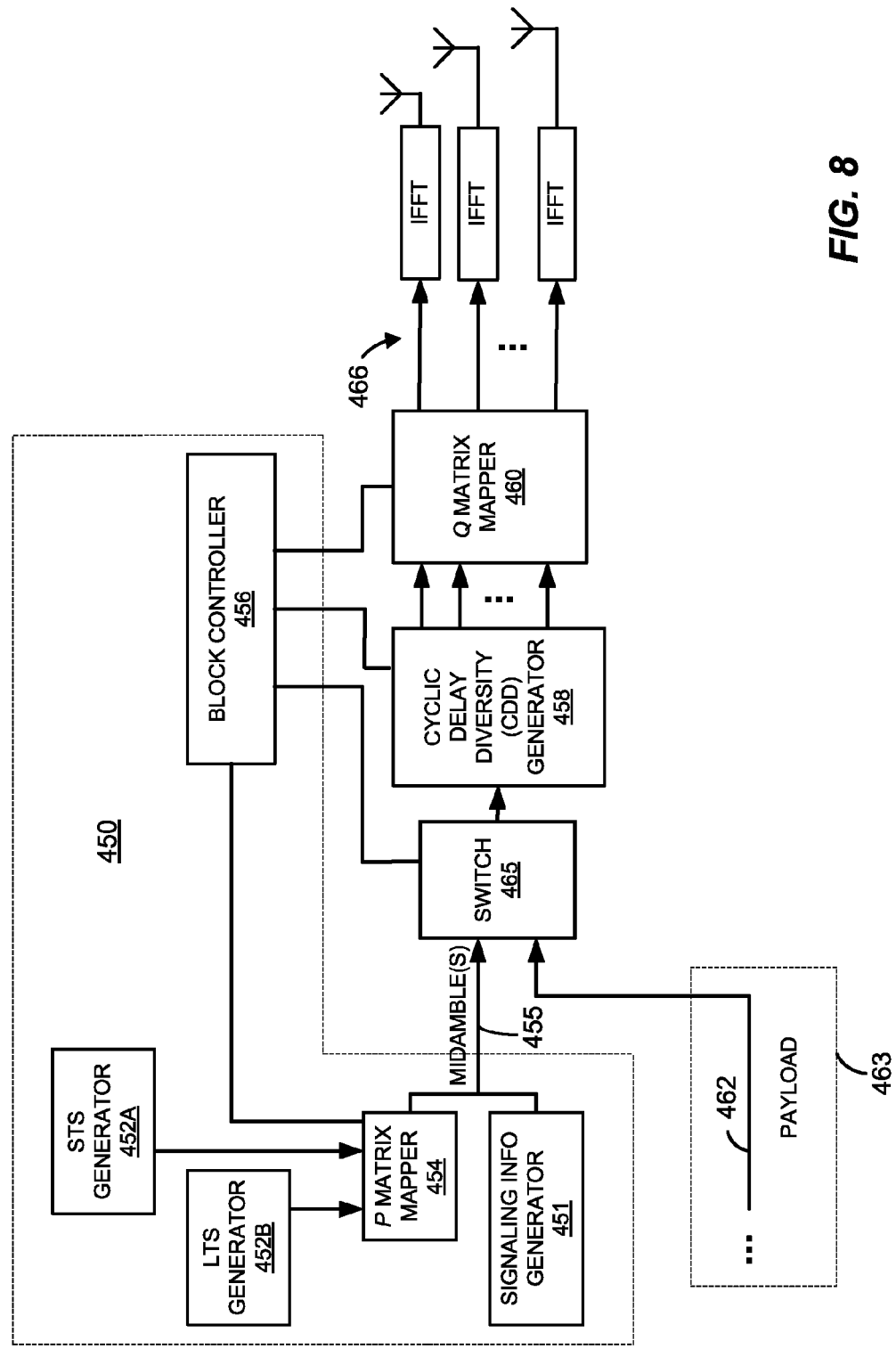
FIG. 8 is a block diagram of an example physical layer (PHY) midamble generator used to generate midambles according to various embodiments of the present disclosure.

Now referring to FIG. 8, an example PHY midamble generator 450 operates in the PHY unit 20 of the device 14 illustrated in FIG. 1, and/or in the PHY unit 29 of the device 25-1, according to an embodiment. The PHY midamble generator 450 includes a signaling information generator 451 to generate symbols corresponding to signaling information or data to communicate characteristics of the data payload (e.g., a VHT-SIG field, a VHT-SERVICE field, or another non-training field). In some embodiments, the signaling information generator 451 may be additionally or alternatively included in a MAC unit, such as the MAC unit 304 of FIG. 7.

The PHY midamble generator 450 includes both a short training symbol (STS) generator 452A to generate symbols of a VHT-STF field and long training symbol (LTS) generator 452B to generate symbols of a VHT-LTF field. In some embodiments (not shown), the PHY midamble generator 450 may include only a STS generator 452A or only an LTS generator 452B. For ease of discussion and clarity, FIG. 8 is described below with respect to using only the LTS generator 452B for LTF sequences applied to VHT-LTF blocks, however, it is understood that the description of FIG. 8 may apply to embodiments of the PHY midamble generator 450 that use only the STS generator 425A to generate STF sequences applied to VHT-STF blocks, and to embodiments of the midamble generator 450 that use both the STS generator 452A for STF sequences applied to VHT-STF blocks and the LTS generator 452B for LTF sequences applied to VHT-LTF blocks.

In an embodiment, the LTS generator 452B generates (or stores) a suitable sequence of symbols (e.g., bits) such as a similar or identical LTF sequence defined in the IEEE 802.11n Standard. The sequence of symbols is supplied to a P matrix mapper 454 that maps symbols to space-time streams. The P matrix mapper 454 applies a mapping scheme in accordance with a selection signal generated by a block controller 456. In an embodiment, the block controller 456 selects the P matrix of a particular dimensionality to be applied to a particular block of VHT-LTFs. In one example, the block controller 456 selects a four-by-four matrix $P_1$ to be applied to a block of four VHT-LTFs and a two-by-two matrix $P_2$ to be applied to a block of two VHT-LTFs.

The outputs of the P matrix mapper 454 and the signaling information generator 451 include one or more midambles 455 that are input to a switch or multiplexer 465. In an embodiment, the block controller 456 additionally controls the switch or multiplexer 465 to alternate reception and/or generation of the one or more midambles 455 from the midamble generator 450 and a next portion of a data payload via a line 462 from a data portion generator 463, such as illustrated in FIG. 3. (Of course, as previously discussed, in some embodiments, only a single midamble is generated for a single data unit by the midamble generator 450.) Additionally, although only a single arrow is illustrated in FIG. 8 as representing the one or more midambles 455 between the midamble generator 450 and the switch 465, this is only for clarity's sake and it is understood that the one or more midamble(s) 455 are delivered from midamble generator 450 to the input of the switch 465 via multiple outputs corresponding to multiple sub-carriers (e.g., as represented by $P^{(k)}$).

The output from the switch 465 is coupled to respective inputs of a CDD (Cyclic Delay Diversity) generator 458 that applies frequency cyclic delay diversity values to the corresponding space-time streams. In an embodiment, the block controller 456 additionally controls the selection of values utilized by the CDD generator 458. As indicated above, the application of a CDD matrix D in some embodiments is equivalent to applying linear phase shifts over different sub-carriers of OFDM. Thus, the CDD transformation is applied to both midamble and data portions of data units, but utilizes the P matrix only for training or sounding in midamble portions.

The outputs of the CDD generator 458 are coupled to a Q matrix mapper 460 that performs spatial mapping of space-time streams to transmit chains 466, each transmit chain corresponding to a respective transmit antenna. Similar to the P matrix mapper 454, the Q matrix mapper 460 is communicatively coupled to the block controller 456 that selects an appropriate matrix Q for each block of VHT-LTFs. In various embodiments, the PHY midamble generator 450 generates the midambles of data units illustrated in FIGS. 3-4.

In an embodiment, the modules 454-460 and 465 together operate as a spatial mapping module that applies different spatial mapping to each training or sounding field. In particular, the module 454 operates as a symbol mapping module that maps symbols to space-time streams that are subsequently mapped to transmit chains. Additionally, it should be noted that although the block controller 456 is illustrated in FIG. 8 as being included in the midamble generator 450, at least some portions of the block controller 456 may be included in (and/or may control) other entities of a transmitter, such as the switch 465, the CDD generator 458, the Q matrix mapper 460, and/or other entities.

Figure 9:
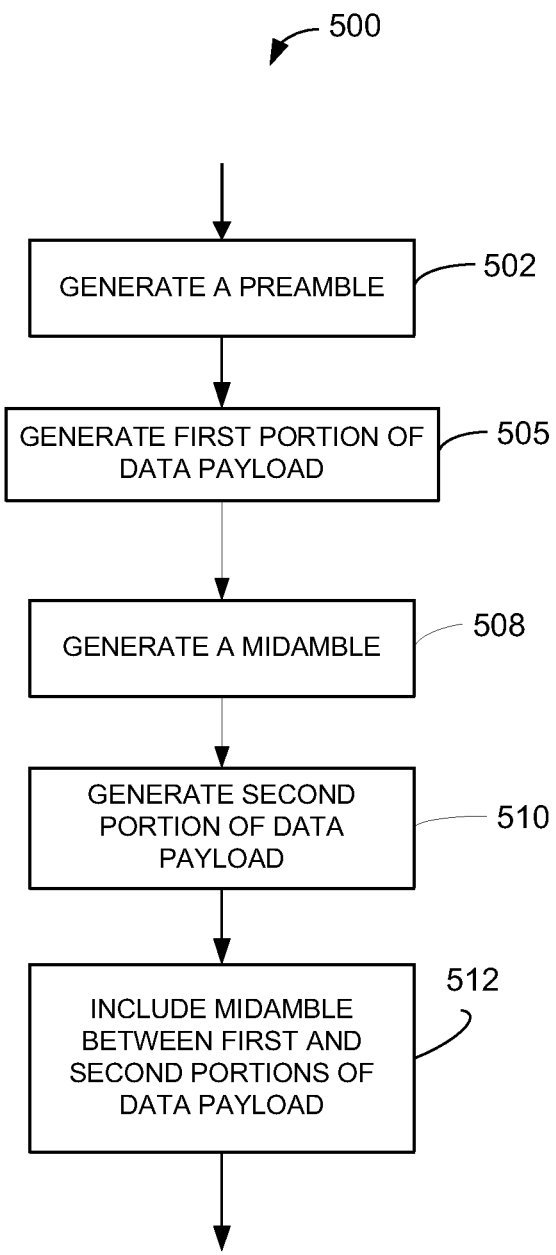
FIG. 9 is a flow diagram of an example method for generating a data unit including a midamble for transmission via a communication channel, according to an embodiment.

FIG. 9 illustrates an example method 500 for generating a single data unit for transmission via a communication channel, according to an embodiment. In various embodiments, the method 500 operates in accordance with embodiments of any of the systems and apparatuses of FIGS. 1, 7 and 8; the data units of FIGS. 2C and 3; and/or the midambles described in conjunction with FIGS. 3-5 and 11-13. In one embodiment, the PHY unit 20 (FIG. 1) and the PHY unit 29 (FIG. 1), are configured to implement the method 500.

Block 502 of the method 500 includes generating a preamble of a single data unit. The preamble may be of format that is compatible for use in a WLAN that includes legacy devices, high throughput devices, and/or devices configured to generate long data units. In some embodiments of the method 500, the block 505 includes generating signaling information to be included in the preamble. The signaling information includes one or more indications of characteristics of the data payload of the data unit, in an embodiment. For example, the preamble indicates a presence of a data payload segment to be transmitted after the preamble. Additionally or alternatively, the preamble indicates (e.g., includes one or more indications) a presence of one or more midambles or midamble segments in the data unit.

Alternatively or additionally, the preamble indicates a size, duration or length of a portion or segment of the data payload. For example, the signaling information or data that is included in the preamble provides an indication of a common size, duration or length of each of the data payload portions included in the data unit. In another example, the signaling information included in the preamble indicates a size, duration or length of only a portion of the data payload that is to be transmitted immediately after the preamble. The size, duration or length of the portion of the data payload may be indicated in the preamble by a number of octets or by a number of OFDM symbols or a number of some other suitable unit. The size, duration or length may be selected from a set of pre-determined sizes, in an embodiment, and the actual content of a particular data payload portion may be padded to an integer number of OFDM symbols.

At block 505, a first portion of a data payload of the single data unit is generated. At block 508, a midamble of the single data unit is generated. The midamble includes one or more OFDM symbols in a format similar to at least a portion of the preamble generated at block 502, such as the formats previously discussed herein. Typically, but not necessarily, the midamble is generated to have a format that is a subset (either in its form, values, size, and/or other characteristic) of the preamble. In particular, generating the midamble 508 includes generating the midamble based on one or more pilot matrices $P^{(k)}$ corresponding to one or more sub-carriers and to one or more space-time streams of a communication channel, where $P^{(k)}$ is a subset of one or more preamble pilot matrices of the single data unit, in an embodiment.

In some embodiments of the method 500, the block 508 includes generating an indication of the midamble, where the indication signifies the presence and/or a location of the midamble within the data portion of the single data unit. The indication of the midamble may be included in the preamble. In some embodiments, generating the indication of the midamble is performed at block 502 or by another block.

In some embodiments of the method 500, the block 508 includes generating signaling information to be included in the midamble. The signaling information includes one or more indications of characteristics of the data payload of the data unit, in an embodiment. In an embodiment, the signaling information indicates a presence of one or more portions or segments of the data payload to be transmitted. For example, each midamble included in the data unit indicates a presence of an additional data payload segment to be transmitted after the data payload segment that immediately follows the midamble. As another example, each midamble included in the data unit indicates whether an additional midamble will follow in the data unit.

Alternatively or additionally, the signaling information included in the midambles indicates a size, duration or length of a portion or segment of the data payload. For example, the signaling information or data that is included in a particular midamble provides an indication of a size, duration or length of the portion of the data payload that is to be transmitted immediately after the particular midamble. The size, duration or length of the portion of the data payload may be indicated by a number of bytes or by a number of OFDM symbols corresponding to the portion. When at least two data payload portions included in a single long data packet are sized differently, their respective sizes are indicated in the signaling information that is included in a respective preceding midamble, in an embodiment. The size, duration or length of a particular data payload portion are selected from a set of pre-determined sizes, in an embodiment, and the actual content of the particular data payload portion is padded to an integer number of OFDM symbols, for example.

With further regard to the block 508, the signaling information or data that is included in the midamble may generated at least partially by a PHY unit, such as the PHY unit 308 of FIG. 7, and/or the signaling information of the midamble may be generated at least partially by a MAC unit, such as the MAC unit 304 of FIG. 7.

The method 500 of FIG. 9 includes interleaving at least one OFDM symbol corresponding to the midamble, in an embodiment. Interleaving includes tone interleaving, space-frequency interleaving, or both. With tone interleaving, each space-time stream is estimated or trained across a different, mutually exclusive subset of subcarriers of the communication channel With space-frequency interleaving, each different space-time stream of a maximum set of space-time streams is trained separately at a different instance in time with each different sub-carrier over a maximum set of subcarriers.

At block 510, a second portion of a data payload is generated. At block 512, the midamble is included between the first portion of the data payload and the second portion of the data payload. In some embodiments, the first portion of the data payload and the second portion of the data payload are of equivalent lengths. In some embodiments, the first portion and the second portions of the data payload are of different lengths.

The method 500 includes transmitting the single data unit from a transmitter to a receiver, in an embodiment. In an example denoted by FIG. 1, the one or more transmit antennas 21-1, 21-2 and 21-3 transmit the single data unit over a channel denoted by a double-sided arrow to one or more of the receive antennas 34-1, 34-2 and 34-3.

In some embodiments, the method 500 includes generating an additional midamble and a third portion of the data payload, and including the midamble between the second data portion of the data payload and the third data portion of the data payload. The third portion of the data payload is of a length the same as or different from the first and/or the second portions of the data payload. If further additional midambles are desired for the single data unit, the method 500 includes generating subsequent additional midambles located between subsequent additional data payloads in a similar manner, according to some embodiments. The additional midambles include signaling information corresponding to one or more data payload portions or segments, in an embodiment.

Figure 10:
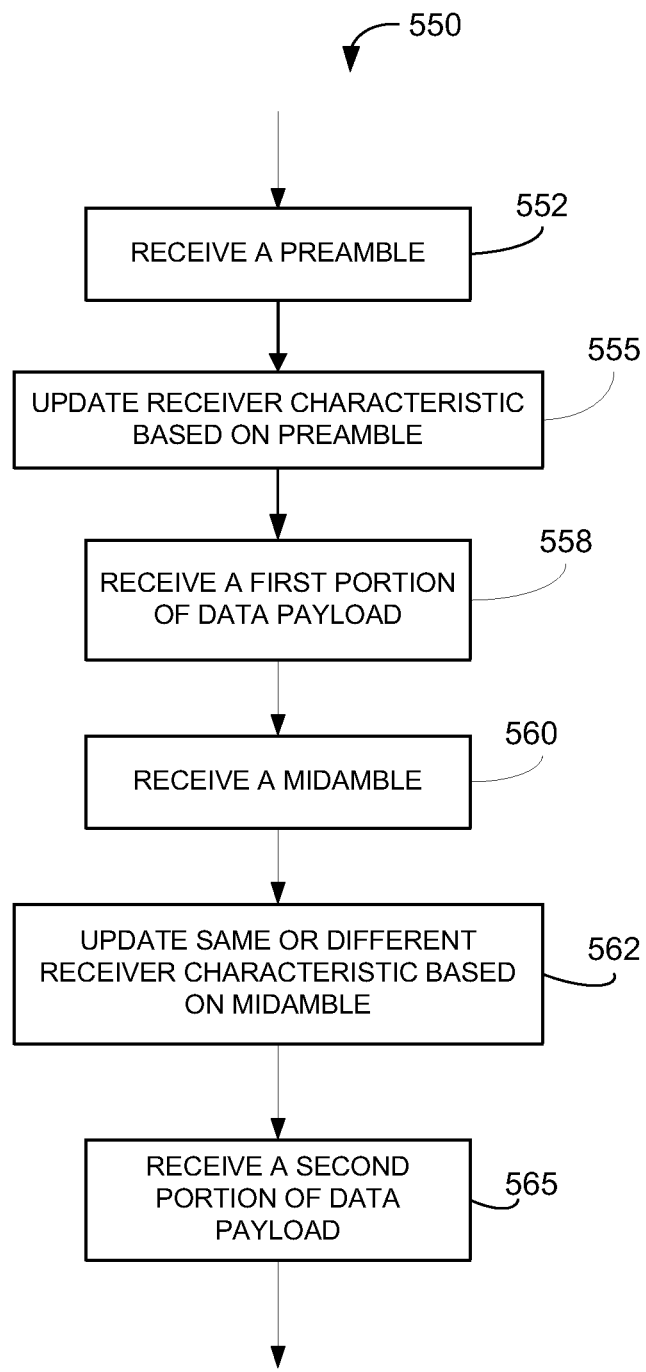
FIG. 10 is a flow diagram of an example method for receiving a data unit including a midamble via a communication channel, in accordance with an embodiment.

FIG. 10 illustrates an example method 550 of receiving a single data unit via a communication channel, according to an embodiment. The method 550 operates in accordance with embodiments of any of the systems and apparatuses of FIGS. 1, 7 and 8; the data units of FIGS. 2C and 3; the midambles described in conjunction with FIGS. 3-5, and/or the method of FIG. 9, in some embodiments. In one embodiment, the PHY unit 20 (FIG. 1) and the PHY unit 29 (FIG. 1), are configured to implement the method 550.

The method 550 includes receiving a preamble 552 of a single data unit. The preamble is of format that is compatible for use in a WLAN that includes legacy devices, high throughput devices, and/or very high throughput devices, according to an embodiment. In some embodiments, the preamble includes an indication of a midamble, where the indication signifies the presence and/or a location of the midamble between different data portions of the single data unit. The preamble (and subsequent fields of the single data unit, for that matter) are received over a channel at one or more receive antennas of a receiver, such as via receive antennas 34-1, 34-2, and 34-3 of client device 25-1 illustrated in FIG. 1.

At block 555, a receiver characteristic is updated based on the preamble. For example, if the preamble includes a VHT-STF field, the receiver uses at least a part of the contents of the preamble to detect the single data unit, to perform synchronization with the transmitter, to re-train automatic gain control, or to perform any other calibration action based on the at least a part of the contents of the VHT-STF field. In another example, if the preamble includes a VHT-LTF field, the receiver is updated to estimate the channel or to perform fine synchronization, or, in the case of a sounding packet, to update a steering matrix or perform some other action for beamforming. Generally, updating a characteristic may include updating or calculating a value of one or more parameters or stored data values, triggering an action based on some or all of the updated or calculated values, triggering an action based on some or all of the information included in the preamble, and/or generating any other response corresponding to estimating the channel and/or calibration actions or techniques to adjust some portion of the receiver based on the resulting estimate.

At block 558, a first portion of a data payload of the single data unit is received. At block 560, a midamble of the single data unit is received. The midamble includes one or more OFDM symbols in a format similar to at least a portion of the preamble received in the block 552, such as one of the formats previously discussed herein, according to an embodiment. The midamble includes a VHT-STF field and/ or one or more VHT-LTF fields, in some embodiments. Typically, but not necessarily, the received midamble is of a format that is a subset (either in form, included values, size, or other characteristic) of the preamble. In one example, receiving the midamble 560 includes receiving one or more OFDM symbols corresponding to the expression $P^{(k)}s(k)$, where $P^{(k)}$ is a channel estimating, pilot or a sounding matrix having at least one dimension corresponding to a maximum number of space-time streams of the communication channel, and s(k) is an OFDM symbol corresponding to the kth sub-carrier or group of sub-carriers.

In an embodiment, the midamble includes signaling information included in one or more non-training fields, where the signaling information corresponds to at least a portion of the data payload, such as a second portion of the data payload to be transmitted after the midamble.

At the block 562, a characteristic at the receiver is updated based on the midamble. The characteristic may be the same characteristic as was updated in the block 555, or the characteristic at the block 562 may be a different characteristic than the characteristic at the block 555. Updating the same or another characteristic at the receiver in the block 562 includes, for example, updating a characteristic at the receiver to estimate the channel, to retrain automatic gain control, to refine carrier frequency offset for addressing drift, to calculate a steering matrix or otherwise perform a portion of beamforming, to adapt to a link, or to address any other desired or suitable calibration procedure of the receiver. In some situations, updating a characteristic at the receiver includes updating a characteristic to realize channel sounding. Generally, updating a receiver characteristic based on the midamble is similar to updating a receiver characteristic based on the preamble, albeit based on different information received during a different portion of the single data unit.

In some embodiments, the midamble contents indicate that not all space-time streams of a channel across all tones or sub-carriers of a channel are considered for updating. For example, if the received midamble corresponds to interleaving, only information corresponding to a subset of sub-carriers is considered for updating at the receiver, or only a subset of the maximal set of possible combinations of space-time stream-sub-carriers is considered at each instance in time for updating at the receiver. At block 562, a second portion of a data payload is received.

At block 565, a second portion or segment of the data payload portion is received. The second portion or segment of the data payload corresponds to the signaling information included in the midamble, in an embodiment.

In some embodiments, additional midambles are received. The additional midambles are received in locations between additional portions of the data payload. One or more of the same or different characteristics of the receiver are updated based on the contents of the additional midambles, and signaling information corresponding one or more data payload portions are included in the additional midambles.

In an embodiment, a midamble of a long data packet includes information corresponding to characteristics of the data payload of the long data packet. As previously discussed, the format of a midamble generally corresponds to the format of the preamble of a data unit (although the midamble omits some information/fields included in the preamble and/or includes additional information/fields not included in the preamble, in various embodiments). Thus, in an embodiment, signaling corresponding to characteristics of the data payload is included in one or more non-training fields (e.g., fields that do not include channel training information) of a midamble, in a manner similar to that of a preamble.

Figure 11:
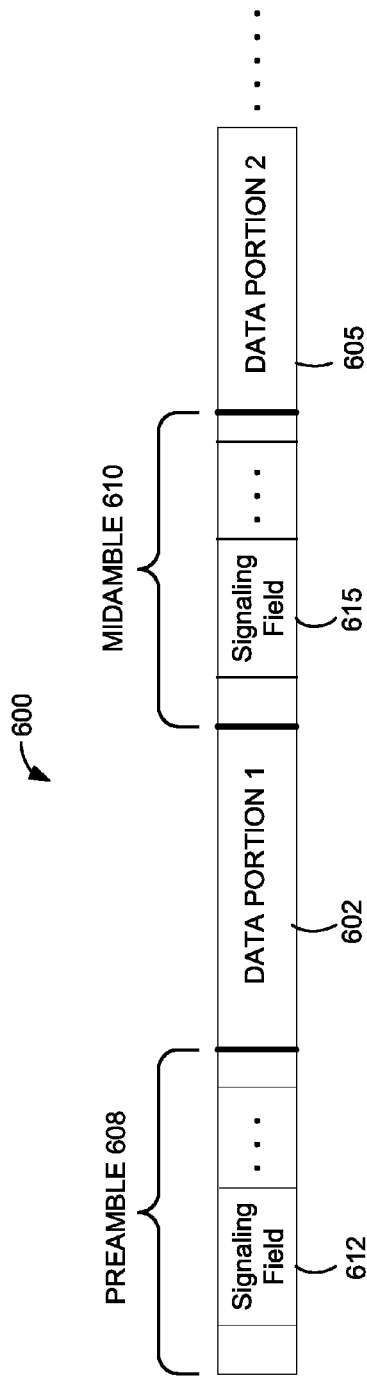
FIG. 11 is a diagram of an example format of a data unit in which characteristics of data payload segments are indicated in midambles, according to an embodiment.

For example, FIG. 11 illustrates an example format of a single long data unit 600 in which the data payload of the data unit 600 is transmitted in more than one portion or segment 602, 605 separated by a midamble 615. The data unit 600 includes a preamble 608 and a midamble 610, each of which includes various fields such as previously discussed, and further includes data payload characteristic information in signaling information that is included in a respective signaling field 612, 615 (e.g., a VHT-SIG field, a VHT-SERVICE field, or some other suitable field). While FIG. 11 depicts only two data segments and one midamble, the techniques described herein apply to data units having any suitable number of data payload segments that are separated in transmission by midambles, such as three data segments, or more data segments. Typically, each data segment is preceded by a corresponding midamble (except a first data segment, which is preceded by the preamble), and the data payload characteristic information included in the midamble corresponds to at least the portion or segment of the data payload transmitted after the midamble.

In an embodiment of the data unit 600 of FIG. 11, the data payload characteristic information included in each of the signaling fields 612, 615 includes information regarding a particular portion of the data payload. In one example, the data payload characteristic information indicates to the receiver whether or not any additional portions of the data payload are included or are present in the data unit 600. Thus, to apply the data unit 600 to this example, the signaling information included in the signaling field 612 of the preamble 608 indicates the presence of the data payload portion 605 and the corresponding midamble 610. Similarly, the signaling information included in the signaling field 615 of the midamble 610 indicates whether a further data portion and corresponding midamble follow the data payload portion 605. The presence of one or more additional portions of the data payload (e.g., the portion 605 and/or other portions) is indicated by one or more bits, in an embodiment.

In another example, the data payload characteristic included in the signaling information that is populated in the signaling fields 612, 615 additionally or alternatively indicates a size, length or duration of a particular portion of the data payload of the single long data unit 600. To apply the data unit 600 to this example, the data payload characteristic information included in the signaling field 612 of the preamble 608 indicates a size of the data payload portion 602, and the data payload characteristic information included in the signaling field 615 of the midamble 610 indicates a size of the data payload portion 605. The size, length or duration of data payload portions provides an indication, to other stations (other than the transmitter and the receiver of the data unit), of a time duration during which the other stations need to defer communications, as the communication channel is being used to deliver the single long data unit 600.

The size, length or duration of the portion of the data payload portion 605 as indicated by the signaling field 615 corresponds to a number of bytes corresponding to the data payload portion 605, in an embodiment. For example, the size of the respective data payload portion 605 indicated in the signaling field 615 corresponds to a number of data bytes of only the actual content of the data payload portion 605. In another example, the size of the data payload portion 605 indicated in the signaling field 615 corresponds to a total number of data bytes of the actual content of the data payload portion 605 and the effective bytes of the midamble 610.

In another embodiment, the size, length or duration of the data payload portion 605 as indicated in the signaling field 615 corresponds to a number of OFDM symbols corresponding to the data payload portion 605. For example, the size of the respective data payload portion 605 is a number of OFDM symbols in which the actual content of the data payload portion 605 is delivered. In another example, the size of the data payload portion 605 is a total number of OFDM symbols in which the midamble content and the actual content of the data payload portion 605 is included.

Irrespective of whether or not sizes of data payload segments are represented in bytes or in OFDM symbols, the midamble generator 312 pads the actual content of the data payload portions 602, 605 to reach an integer number of OFDM symbols, in an embodiment. For example, each data payload portion 602, 605 is padded with all zeroes or with all ones to fully populate an integer number of OFDM symbols.

In an embodiment, the number of OFDM symbols for each portion or segment of the data payload of the data unit is the same for all segments, such as shown in FIG. 3 where the number of OFDM symbols in each portion of the data payload of the data unit 100 is $N_d$. In other embodiments, at least two data portions of the data payload are of different sizes, such as illustrated in FIG. 12.

Figure 12:
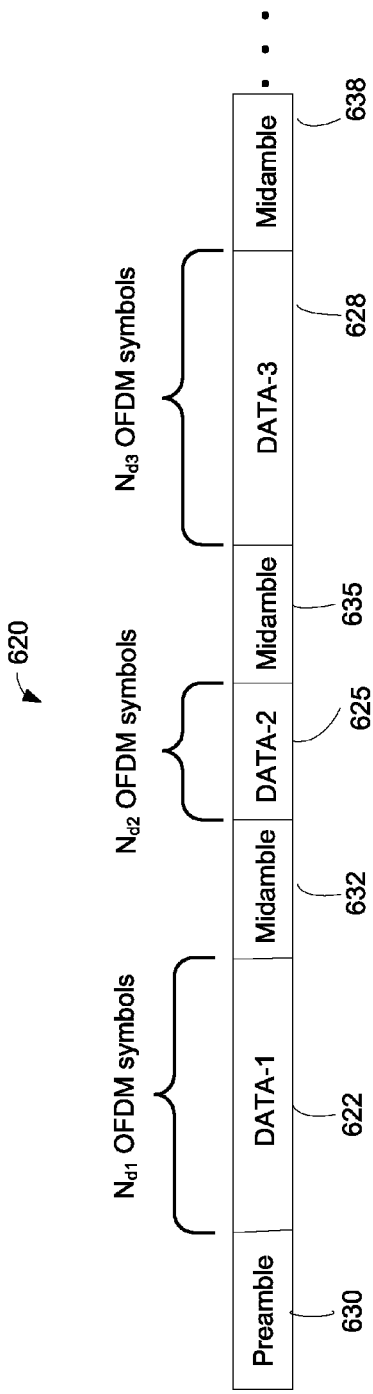
FIG. 12 is a diagram of an example format of a data unit having midambles and differently sized data payload segments, according to an embodiment.

Specifically, FIG. 12 illustrates an example of a long data packet 620 in which data portions 622, 625, 628 of the data payload are differently sized. Specifically, a first portion 622 of the data payload includes $N_{d1}$ OFDM symbols, a second portion 625 of the data payload includes $N_{d2}$ OFDM symbols, and a third portion 628 of the data payload includes $N_{d3}$ OFDM symbols. In the embodiment shown in FIG. 12, a size of a next portion of the data payload is indicated in the signaling field of the preamble 630 or the midamble 632, 635 that is transmitted immediately prior to the next portion. That is, the size of the first portion 622 of the data payload is indicated in a signaling field of the preamble 630, a size of the second portion 625 is indicated in a signaling field of the midamble 632, and a size of the third portion 628 of the data payload is indicated in a signaling field of the midamble 635. In embodiments of data units having midambles which indicate varying sizes of data payload segments or portions, an indication of a uniform data segment size is omitted from the preamble 630, as the sizes of the various data segments of the data payload may vary across the data unit. Indeed, in embodiments of data units having midambles that indicate data payload characteristics, preambles of such data units may exclude some or all indications of data payload characteristics.

In an embodiment, the size of the respective portion of the data payload is represented in the signaling field by one of a set of pre-defined sizes. For example, the set of pre-defined sizes includes three possible sizes and is represented by two bits in the signaling field, e.g., binary "00" indicates no midamble, binary "01" indicates $N_{d1}$ symbols, binary "10" indicates $N_{d2}$ symbols, and binary "11" indicates $N_{d3}$ symbols. The set of pre-defined sizes may include any number of members, such as two members, four members, eight members, and the like.

FIG. 13 illustrates an embodiment of the midamble 610 of FIG. 11. In the midamble 610, the signaling information is populated into a VHT-SIG field of the midamble 610. That is, the data payload characteristic information 615 is populated into a VHT-SIG field 650 of the midamble 610. In an example, the VHT-SIG field 650 of the midamble 610 is transmitted after the first VHT-LTF 652 of the midamble, in an embodiment in which the first multi-stream mapping of the channel training matrix (e.g., the first column of $P^{(k)}$) is used as the first VHT-LTF 652. Additionally, the VHT-SIG field 650 of the midamble 610 is transmitted prior to a next VHT-LTF 655, in an embodiment. The VHT-SIG field 650 includes data characteristic information, such as an indication of a size of a portion of the data payload, and/or an indication of whether or not any additional portions of the data payload are included in the data unit 600.

Additionally, although FIG. 13 illustrates the midamble 610 as including a VHT-STF 658, the VHT-STF 658 may be omitted in some embodiments, as indicated by the dashed lines.

While not illustrated, in some embodiments, the signaling information included in the midamble 610 is at least partially included in a VHT-SERVICE field of the data unit 600. Typically, the VHT-SERVICE field is represented by an initial number of bits of a data payload segment that immediately follows the midamble 610. In an embodiment, the data payload characteristic information is populated into a subsequent VHT-SERVICE field or into reversed bits of a VHT-SERVICE field, instead of in the VHT-SIG field. In an embodiment, the data payload characteristic information 615 is populated into another, non-training field of the midamble or the payload other than the VHT-SIG field or the VHT-SERVICE field. In an embodiment, portions of the data payload characteristic information 615 are populated across different fields. In one example, a first portion of the data payload characteristic information 615 is populated into a portion of the VHT-SIG field, and a second portion of the data payload characteristic information 615 is populated into a portion of the VHT-SERVICE field.

In some embodiments, portions of the content of the data payload are included in at least one of the VHT-SIG field, the VHT-SERVICE field, or another field of the data unit 600, whether or not such field includes any data payload characteristic information 615. In this manner, higher throughput and efficiency of transmission of the data unit 600 may be obtained by taking advantage of unused space in non-training fields to deliver actual data payload content.

In an embodiment, the data payload characteristic information 615 is populated in a PHY header or midamble portion of the data unit. For example, the data payload characteristic information 615 is populated into a VHT-SIG field, and/or some other non-training field in a PHY header or midamble portion of the data unit. In an embodiment, the data payload characteristic information 615 is populated into a VHT-SERVICE field, and/or some other non-training field in a MAC header or midamble portion of the data unit. In an embodiment, portions of the data payload characteristic information 615 are populated in both PHY and MAC portions. For example, a first portion of the data payload characteristic information 615 is populated into a portion of the VHT-SIG field, and a second portion of the data payload characteristic information 615 is populated into a portion of the VHT-SERVICE.

Each of FIGS. 14-17 illustrates an embodiment of a format of a midamble that has more than one OFDM symbol. The formats illustrated in FIGS. 14-17 are utilized as one or more of the midambles 108a, 108b or 108c of FIG. 3, in various embodiments. Each of the midambles shown in FIGS. 14-17 is based on the generalized format of the midamble 120 of FIG. 4.

FIG. 14 is a diagram of a portion of a data unit, the data unit including a midamble 700, according to an embodiment. The midamble 700 is transmitted between a first portion 702a and a second portion 702b of a data payload of a single long data unit, and includes a VHT-LTF 705. The VHT-LTF 705 includes a set of Long Training Symbols (LTSs) 708a, 708b that correspond to a plurality of OFDM symbols (e.g., each LTS 708 corresponds to an OFDM symbol, in an embodiment). Although FIG. 14 illustrates the set of LTSs as including two members 708a, 708b, in other embodiments, the set of LTSs may include one member, more than two members, or any suitable number of members. Typically, the number of members of the set of LTSs included in the VHT-LTF 705 corresponds to the number of LTSs included in the preamble of the long data unit.

In an embodiment, the OFDM symbol corresponding to LTS 708a is the same OFDM symbol corresponding to LTS 708b. In an embodiment, the OFDM symbol corresponding to LTS 708a is different than the OFDM symbol corresponding to LTS 708b. A channel training or pilot matrix $P^{(k)}$ is applied to OFDM symbols corresponding to the set of LTSs 708a, 708b to generate the VHT-LTF 705, in an embodiment.

The VHT-LTF 705 is one VHT-LTF in a set of VHT-LTFs included in the midamble 700, in an embodiment. The set of VHT-LTFs includes one member, two members, more than two members, or any suitable number of members, in various embodiments.

The example format of the midamble 700 includes a VHT-STF 710, which is transmitted after transmission of the data segment 702a and prior to transmission of the LTSs 708a, 708b of the VHT-LTF 705. The VHT-STF 710 and the VHT-LTF 705 are separated by a guard interval 712 to ensure that the VHT-STF 710 and the VHT-LTF 705 do not interfere with each other, in an embodiment. Typically, in OFDM systems, the guard interval corresponds to an interval of time during which no symbols are transmitted. In FIG. 14, the guard interval 712 is shown as a double guard interval (DGI), but in other embodiments the guard interval 712 is a single guard interval or some other suitable multiple number of a single guard interval (e.g., a triple guard interval or a quadruple guard interval), in various embodiments.

For multi-stream packets, other VHT-LTFs are transmitted after the VHT-LTF 705. Each of the other VHT-LTFs is corresponds to one or more OFDM symbols, in various embodiments, and is separated from adjacent VHT-LTFs by suitable guard intervals, in an embodiment. In an embodiment, the guard intervals separating the other VHT-LTFs are single or normal guard intervals, as opposed to the double guard interval 712 separating the VHT-STF 710 and the VHT-LTF 705. In other embodiments, however, the guard intervals separating the other VHT-LTFs are each a multiple guard interval (e.g., double guard interval, triple guard interval, etc.).

In some embodiments in which a midamble includes multiple OFDM symbols, the midamble does not include any VHT-STFs. FIG. 15 is a diagram of a portion of a data unit, the data unit including a midamble 720 that omits any VHT-STF fields, according to an embodiment. The midamble 720 includes one or more VHT-LTFs 725. In an embodiment, the VHT-LTF 725 includes a set of LTSs 730. Although FIG. 15 illustrates the set of LTSs as including two members 730a and 730b, in other embodiments, the set of LTSs includes one member, more than two members, or any suitable number of members. Typically, the number of members of the set of LTSs included in the VHT-LTF 725 corresponds to the number of LTSs included in the preamble of the long data unit.

The midamble 720 is transmitted after transmission of a first portion 722 of the data unit's data payload, and is separated from the VHT-LTF 725 by a guard interval 728, in an embodiment. In various embodiments, the guard interval 728 is a single or normal guard interval, or a multiple guard interval (e.g., double guard interval, triple guard interval, etc. In some embodiments, a subsequent portion of the data payload 732 is transmitted after the LTSs 730a, 730b. The VHT-LTF 725 is one VHT-LTF in a set of VHT-LTFs included in the midamble 720, in an embodiment. The set of VHT-LTFs includes one member, two members, more than two members, or any suitable number of members, in various embodiments.

For multi-stream packets, other VHT-LTFs are transmitted after the VHT-LTF 725. Each of the other VHT-LTFs corresponds to one or more OFDM symbols, in various embodiments, and is separated from adjacent VHT-LTFs by guard intervals, in an embodiment. In an embodiment, the guard intervals separating the other VHT-LTFs are single or normal guard intervals, as opposed to the double guard interval 712 separating the VHT-STF 710 and the VHT-LTF 705 of FIG. 14. In other embodiments, however, the guard intervals separating the other VHT-LTFs are each a multiple guard interval (e.g., double guard interval, triple guard interval, etc.).

FIG. 16 is a diagram of a portion of a data unit, the data unit including a midamble 740, according to an embodiment. The midamble 740 is transmitted after a portion 742 of the data payload of a long data unit. The midamble 740 includes a VHT-STF 745, and the midamble also includes a VHT-LTF 748 that has a segmented or portioned plurality of LTSs 750a-750d. In particular, the VHT-LTF 748 includes four LTS repetitions 750a-750d in which the OFDM symbol corresponding to each LTS 750a-750d is the same OFDM symbol. In other embodiments, though, an OFDM symbol corresponding to one of the LTSs 750a is different than an OFDM symbol corresponding to at least one other of the LTSs 750b-750d included in the midamble 740. In another embodiment, each LTS 750a-750d is different than each of the other LTSs 750a-750d. Generally, a set of LTSs included in the VHT-LTF 748 has any suitable non-zero number of members, such as one member, two members, more than two members, or any suitable number, in various embodiments.

The midamble 740 includes a guard interval 752 that is transmitted between the VHT-STF 745 and a first or initial portion 750a, 750b of the LTSs. In various embodiments, the guard interval 752 is, for example, a double guard interval, a triple guard interval, or some other multiple of a single or normal guard interval. In another embodiment, the guard interval 752 is a single guard interval. Additional guard intervals 755, 758 are transmitted before respective portions 750c, 750d of the LTSs, in an embodiment. In an embodiment, the additional guard intervals 755, 758 are single or normal guard intervals, as opposed to the multiple guard interval 752 separating the VHT-STF 745 and the VHT-LTF 748. In other embodiments, however, the guard intervals 755, 758 are each a multiple guard interval (e.g., double guard interval, triple guard interval, etc.).

In FIG. 16, a first portion of the plurality of LTSs 750a-750d includes two LTSs, i.e., 750a and 750b not separated by a guard interval. Each subsequent portion of the plurality of LTSs includes a single LTS separated from other portions by a guard interval, i.e., LTS 750c is included in a portion, LTS 750d is included in a different portion, and LTS 750c is separated from the first portion (LTSs 750a, 750b) and the LTS 750d by guard intervals 755 and 758, respectively. In an embodiment, a number of LTSs included in a first portion of plurality of LTSs is greater than a number of LTSs included in each subsequent portion. In an embodiment, the number of LTSs included in each subsequent portion is the same. In an embodiment, the number of LTSs included in each portion of the plurality of LTSs is determined based on characteristics of the communication channel and the data unit, and is any suitable number of LTSs in various embodiments and/or scenarios.

The VHT-LTF 748 is a member a set of VHT-LTFs included in the midamble 740. The set of VHT-LTFs includes one member, two members, more than two members, or any suitable number of members, in various embodiments and/or scenarios. VHT-LTFs included in the midamble 740 other than the VHT-LTF 748 each include multiple LTSs, in some embodiments and/or scenarios. VHT-LTFs included in the midamble 740 other than the VHT-LTF 748 each include only a single LTS, in some embodiments and/or scenarios.

FIG. 17 is a diagram of a portion of a data unit, the data unit including a midamble 760, according to an embodiment. The midamble 760 is transmitted after a portion 762 of the data payload of a long data unit. The midamble 760 excludes any VHT-STFs and includes a VHT-LTF 765 that has four LTS repetitions 768a-768d, in an embodiment. The midamble 760 includes a guard interval 770 transmitted prior to the plurality of LTSs 768a-768d which is a multiple guard interval in an embodiment, or a single or normal guard interval in another embodiment. Additionally, the midamble 760 includes other guard intervals 772, 775 that are transmitted prior to other respective portions 768c, 768d of the plurality of LTSs. The LTSs 768a-768d and the guard intervals 772, 775 are configured and arranged in manners similar to those discussed for the LTSs 750a-750d and guard intervals 755, 758 of FIG. 16, in some embodiments. Also similar to FIG. 16, the VHT-LTF 765 is a member of a set of VHT-LTFs included in the midamble 760, in an embodiment. The set of VHT-LTFs included in the midamble 760 has one member, two members, more than two members, or any suitable number of members, in various embodiments. VHT-LTFs included in the midamble 760 other than the VHT-LTF 765 include a single LTS, or multiple LTSs, in various embodiments.

Of course, although FIGS. 16 and 17 each illustrate midambles with VHT-LTFs including only four LTSs, the principles described equally apply to midambles with VHT-LTFs having any suitable number of LTSs, such as one LTS, two LTSs, or five LTSs, etc. Typically, the number of LTSs is based on characteristics of the communication channel and of the data unit, in various embodiments and/or scenarios.

In some embodiments in which a midamble has a VHT-LTF including multiple LTSs, the midamble also includes signaling information corresponding to characteristics of the data payload. The signaling information is populated into at least some portions of a signaling field, such as a VHT-SIG field, a VHT-SERVICE field, or another "non-training" field of the data packet that is not used for channel training or does not include any short or long channel training symbols. The signaling information is included in a PHY header, in a MAC header, or in both the PHY header and the MAC header, in various embodiments. In an example, the signaling information indicates whether or not any additional data payload segments are included in the data unit. Additionally or alternatively, the signaling information indicates a size of a data payload segment that is to be transmitted. For example, the signaling information indicates a number of bytes or a number of symbols corresponding to one or more particular data payload segments.

Figure 18:
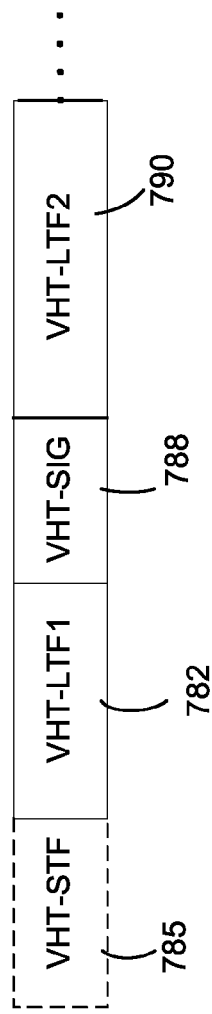
FIG. 18 is a diagram of another example format of a midamble including a plurality of training symbols, a set of VHT-LTFs, and signaling information that indicates characteristics of a data payload, according to another embodiment.

With regard to midambles including signaling information, FIG. 18 is a diagram of an example midamble 780 having a VHT-LTF1 782 that includes multiple LTSs (not shown) and a signaling information included in a signaling field 788, according to an embodiment. The VHT-LTF1 782 has a format that is similar to any of the previously discussed "multiple-LTS" VHT-LTFs, such as the VHT-LTF 705, 725, 748 or 765, in various embodiments. The VHT-LTF1 705 is one member of a set of VHT-LTFs included in the midamble 780, in an embodiment. The set of VHT-LTFs includes one member, two members, more than two members, or any suitable number of members, in various embodiments and/or scenarios, however, in the example illustrated in FIG. 18, the set of VHT-LTFs includes at least two members, i.e., VHT-LTF1 782 and VHT-LTF2 790. VHT-LTFs included in the midamble 780 other than VHT-LTF1 782 each include multiple LTSs or each include only one LTS, in various embodiments. Furthermore, the midamble 780 is shown in FIG. 18 as including a VHT-STF 785. In other embodiments, however, the VHT-STF 785 is omitted (as indicated by the dashed lines).

The signaling field 788 is illustrated in FIG. 18 as a VHT-SIG field, and is populated with signaling information corresponding to a data payload segment that is to be transmitted after transmission of the midamble 780, in an embodiment. The signaling field 788 includes information that indicates a length in bytes or symbols of the data payload segment immediately following the midamble 780, in an embodiment. Additionally or alternatively, the signaling field 788 includes information that indicates whether any additional data payload segments are to be transmitted after the payload segment immediately following the midamble 780. In some embodiments, signaling information is at least partially populated into a VHT-SERVICE field and/or into another suitable field that does not include channel training data or information. For example, signaling information is at least partially populated into a field, such as a SERVICE field and/or another suitable field, in a PHY payload portion of the data unit that follows the midamble 780, in an embodiment.

Figure 19:
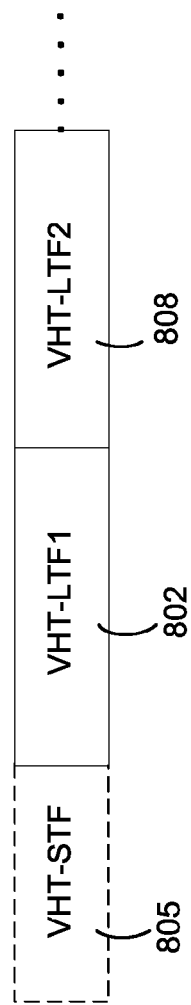
FIG. 19 is a diagram of another example format of a midamble including a plurality of training symbols and a set of VHT-LTFs, and excluding any signaling field populated with signaling data that indicates characteristics of a data payload, according to another embodiment.

FIG. 19 is a diagram of an example midamble 800 that includes a VHT-LTF1 802 having multiple LTSs (not shown), and that excludes a signal field such as the VHT-field 788 of FIG. 18, according to an embodiment. The VHT-LTF1 802 may be similar to any of the previously discussed "multiple-LTS" VHT-LTFs, such as the VHT-LTF 705, 725, 748 or 765, in various embodiments. The VHT-LTF1 802 is a member of a set of VHT-LTFs included in the midamble 800, in an embodiment. The set may include one member, two members, more than two members, or any suitable number of members, according to various embodiments and/or scenarios, however, in the embodiment illustrated in FIG. 19, the set of VHT-LTFs includes at least two members, i.e., VHT-LTF1 802 and VHT-LTF2 808. VHT-LTFs included in the midamble 800 other than VHT-LTF1 802 each include multiple LTSs, in an embodiment, or only a single LTS, in another embodiment. In the embodiment illustrated in FIG. 19, the midamble 800 is shown as including a VHT-STF 805. In other embodiments, the VHT-STF 805 is omitted (as indicated by the dashed lines). In an embodiment, signaling information is populated into a field, such as a SERVICE field and/or another suitable field, in a PHY payload portion of the data unit that follows the midamble 800.

Figure 20:
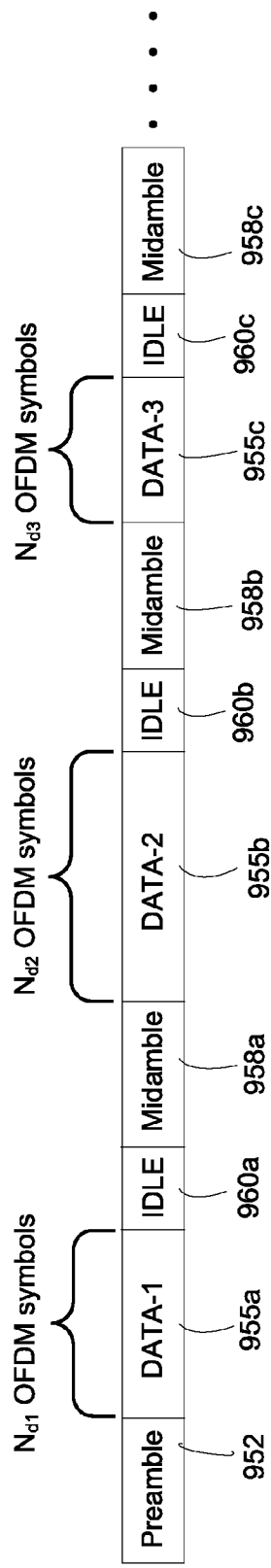
FIG. 20 is a diagram of an example format of a single data unit that includes midambles and one or more idle periods, according to an embodiment.

Referring again to FIG. 3, in some embodiments, an idle or silent period is included between at least some of the segments 105*a*, 105*b*, 105*c*. FIG. 20 illustrates an example format of a data packet or unit 950 that has a preamble 952, segmented data payload portions 955, midambles 958, and idle or silent periods 960. The data packet 950 is an embodiment of the data packet 100 of FIG. 3, for example. The data portions 955*a*-955*c* are of equal lengths, in an embodiment, so that $N_{d1}=N_{d2}=N_{d3}$. In other embodiments, at least two of the respective data portions are of different lengths, e.g., $N_{d1}$ is not equal to $N_{d2}$, or $N_{d1}$ is not equal to $N_{d2}$ and $N_{d2}$ is not equal to $N_{d3}$.

In some embodiments of the data unit 105 in which the idle period 960 is to be applied on a per data payload segment basis (e.g., as illustrated in FIG. 20 where an idle period 960 is to transmitted between every data payload segment or portion 955), the indication of the presence of the idle periods 960 are provided in the preamble 952, and such presence indications of the idle periods are not included in the midambles 958. Furthermore, in some embodiments, each data payload segment 955 shares the same MAC header.

In embodiments of the data unit 105 in which an idle period 960 is included between some but not each and every data payload or segment 955, the indication of a presence or an absence of an idle period corresponding to a particular data payload segment is indicated in the preamble 952 and in each midamble 958, respectively. For example, if the idle period 960*b* is to be omitted, the midamble 958*a* indicates that the idle period 960*b* is to be omitted, while the preamble 952 indicates that the idle period 960*a* is to be included and the midamble 958*b* indicates that the idle period 960*c* is to be included.

Referring again to FIG. 3, in long data packets or units, such as the data unit 100, the data payload is segmented into different portions 105*a*, 105*b*, 105*c*. Although FIG. 3 illustrates the data unit 100 as having three data payload portions 105*a*, 105*b*, 105*c*, the data payload 105 may be segmented or portioned into any number of data payload portions, such as two data payload portions, four data payload portions, or more data payload portions. Each data payload portion is segmented from other data payload portions by a respective midamble to provide channel coherence and to signal information about subsequent data payload portions, in an embodiment. As the data payload is segmented and relatively long, at least some of the segments 105*a*, 105*b*, 105*c* of the data payload are processed to provide for error correction and/or decoder convergence, in some embodiments.

For example, in some embodiments, the segments 105*a*, 105*b*, 105*c* are processed as a whole. That is, processing is applied across all of the data content bits included in the segments 105*a*, 105*a*, 105*c* in their collective entirety. In other words, processing is applied continuously over all of the data payload content bits of all segments or portions 105*a*, 105*b*, 105*c*. In some embodiments, the type of processing is indicated in the preamble 102 or at the beginning of the first data payload portion to be transmitted 105*a*.

In some embodiments, the segments 105*a*, 105*b*, 105*c* are processed separately or individually. That is, processing is applied on a per-segment basis to each data payload portion or segment 105*a*, 105*b*, 105*c*. In other words, processing is applied to the respective set of data payload content bits in each data payload segment separately from the respective sets of data payload content bits in other data payload segments. In such embodiments, the type of processing is indicated prior to the respective transmission of each segment 105*a*, 105*b*, 105*c*, such as in a preamble 102 or in a respective midamble 108*a*, 108*b* that is transmitted prior to each segment 105*a*, 105*b*, 105*c*. In some embodiments, the type of processing is indicated at beginning of each segment 105*a*, 105*b*, 105*c*, such as in a SERVICE field.

Figure 21:
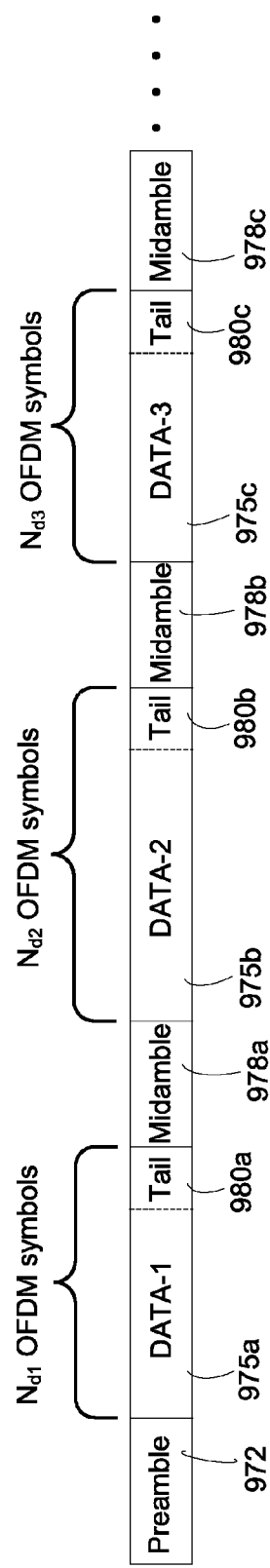
FIG. 21 is a diagram of an example format of a single data unit that includes midambles and one or more sets of tail bits, according to an embodiment.

Another example of a data payload modification is the encoding of data payload content bits of a data unit or packet. FIG. 21 illustrates an example format of a data packet or unit 970 that has a preamble 972, segmented data payload portions 975, midambles 978, and sets of tail bits 980 that are included in respective data payload portions 975, according to an embodiment. The data packet 970 is an embodiment of the data packet 100 of FIG. 3, for example. The data portions 975*a*-975*c* are of equal lengths, in an embodiment, so that $N_{d1}=N_{d2}=N_{d3}$. In other embodiments, at least two of the respective data portions are of different lengths, e.g., $N_{d1}$ is not equal to $N_{d2}$, or $N_{d1}$ is not equal to $N_{d2}$ and $N_{d2}$ is not equal to $N_{d3}$.

In some embodiments of the data unit 970, the data payload content bits of each data payload segment or portion 975 are encoded separately from other segments, or on a per-segment basis as illustrated in FIG. 21. In these embodiments, a respective modulation and coding scheme (MCS) sub-field indicates the type of modulation and encoding to be performed on the corresponding data payload segment or portion 975. Typically, the respective MCS sub-field is included in a SIG field of a preamble or midamble that is to be transmitted prior to the corresponding data payload segment 975. For example, a SIG field included in the preamble 972 includes a respective MCS sub-field to indicate the encoding or type thereof of the first data payload portion 975*a*, a SIG field included in the midamble 978*a* includes a respective MCS sub-field that indicates the encoding or type thereof of the second data payload portion 975*b*, and a SIG field included in the midamble 978*b* includes a respective MCS sub-field that indicates the encoding or type thereof of the third data payload portion 975*c*. In an embodiment, the encoding to be performed or applied to the data content bits is a type of binary convolutional coding (BCC).

In some embodiments of the data unit 970, a set of tail bits 980 is provided in each data payload segment 975 to cause convergence of decoding at the receiver. In the embodiment shown in FIG. 21, each set of tail bits 980 includes six bits, but in other embodiments, each set of tail bits 980 may include any number of bits, such as one bit, three bits, or some other suitable number of bits. Also in FIG. 21, each set of tail bits 980 is depicted as being transmitted at the end of a respective data payload segment 975. In other embodiments, though, each set of tail bits 980 is included in a SIG field corresponding to the respective data payload segment 975, similar to the MCS sub-field as discussed above.

In embodiments of the data unit 970 where a set of tail bits is transmitted for some but not each and every data payload or segment 975, the indication of the presence or absence of a particular set of tail bits in a particular data payload segment is indicated in the preamble 972 and in each midamble 978. For example, if the tail bits 980*b* are to be omitted, the midamble 978*a* indicates that the set of tail bits 980*b* is to be omitted, while the preamble 972 indicates that the set of tail bits 980a is to be transmitted and the midamble 978b indicates that the set of tail bits 980c is to be transmitted.

In some embodiments of the data unit 970, the data payload content bits of all data payload segments 975 are to be encoded as a whole. That is, all of the data content bits included in all of the data payload segments 975 are encoded in their collective entirety, or the data payload content bits of all segments 975 are encoded continuously. In these embodiments, the MCS sub-field of the preamble 972 indicates the encoding or type thereof to be applied to the collective set of data payload content bits, and additional encoding indications are omitted from the midambles 978. The encoding to be performed or applied to the data content bits is a type of binary convolutional coding (BCC), in an embodiment. In these embodiments in which the data payload content bits are continuously encoded, only a single set of tail bits is included in the data unit 970. For example, the single set of tail bits is included in a SIG field of a last midamble to be transmitted (not shown), or the single set of tail bits is included at the end of the data payload segment that is to be the last transmitted data payload segment (not shown).

Figure 22:
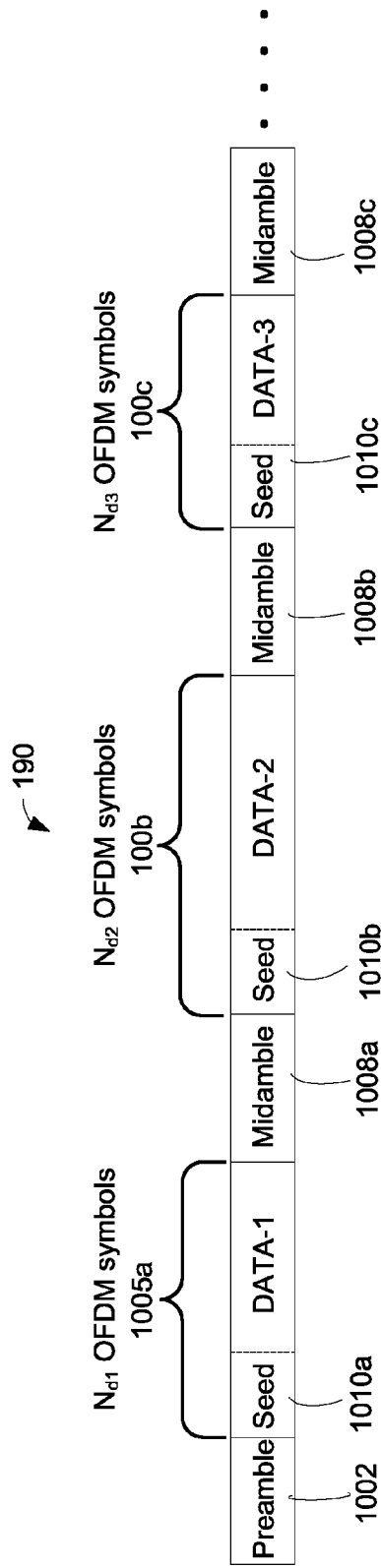
FIG. 22 is a diagram of an example format of a single data unit that includes midambles and one or more scrambling seeds, according to an embodiment.

FIG. 22 illustrates an example format of a data packet or unit 1000 that has a preamble 1002, segmented data payload portions 1005, and midambles 1008, according to an embodiment. The data packet 1000 is an embodiment of the data packet 100 of FIG. 3, for example. The data payload portions 1005a-1005c are of equal lengths, in an embodiment, so that $N_{d1}=N_{d2}=N_{d3}\ldots$, where $N_{d1}$ is a number of OFDM symbols in the data payload portion 1005a, $N_{d2}$ is a number of OFDM symbols in the data payload portion 1005b, and $N_{d3}$ is a number of OFDM symbols in the data payload portion 1005c. In other embodiments, at least two of the respective portions are of different lengths, e.g., $N_{d1}$ is not equal to $N_{d2}$, or $N_{d1}$ is not equal to $N_{d2}$ and $N_{d2}$ is not equal to $N_{d3}$.

In some embodiments, the data payload content bits of each data payload segment or portion 1005 are scrambled separately or on a per-segment basis (as illustrated in FIG. 22) based on a respective scrambling seed 1010. Each respective scrambling seed 1010 is included in a SERVICE field of a corresponding data payload segment 1005, in an embodiment. Typically, the SERVICE field is the first two bytes of a data payload segment 195. Each scrambling seed 1010 is the same scrambling seed, in an embodiment. In other embodiments, at least two of the scrambling seeds 1010 are different scrambling seeds. In an embodiment, each scrambling seed 1010 is different than every other scrambling seed 1010 in the data unit 1000.

In embodiments in which only some but not all of the data payload segments 1005 are scrambled, the absence of scrambling in a particular data payload segment may be indicated by a particular value of the corresponding scrambling seed 1010 (e.g., a NULL value or other suitable value), in an embodiment. Furthermore, the presence or absence of scrambling in a particular data payload segment is indicated in the preamble 1002 and in each midamble 1008, in an embodiment. For example, the preamble 1002 indicates whether or not the first data payload portion 1005a is scrambled, and the midamble 1008a indicates whether or not the second data payload portion 1005b is scrambled. The indication of whether a data portion is scrambled is a field in the corresponding preamble or midamble that precedes the data portion, in an embodiment.

In some embodiments, the data payload content bits of all data payload segments 1005 are scrambled as a whole. That is, all of the data content bits included in all of the data payload segments 1005 are scrambled in their collective entirety, or the data payload content bits of all segments 175 are scrambled continuously. In these embodiments, a single scrambling seed 1010a is applied to all of the data payload content bits 175, and is included in only the first data payload segment or portion 1005a. Thus, in some embodiments, the other scrambling seeds 1010b, 1010c, . . . are omitted.

Figure 23:
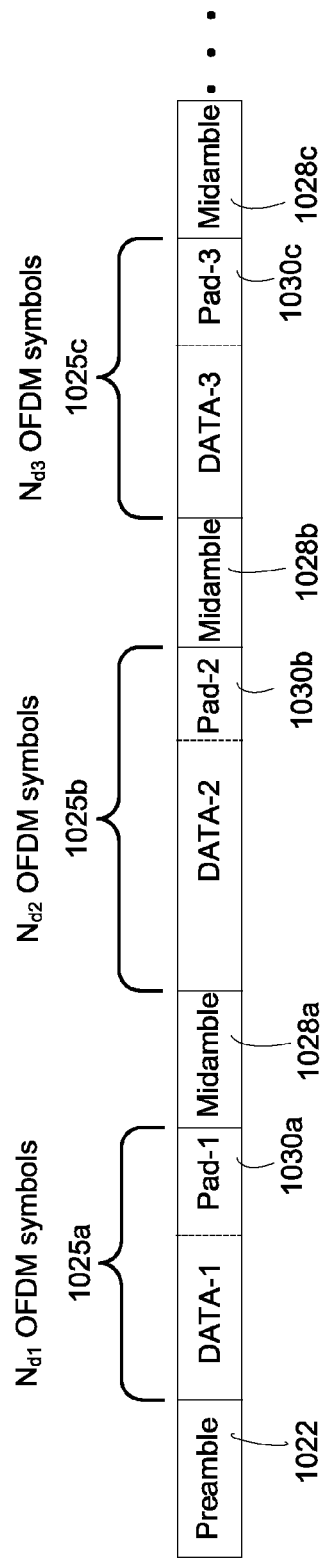
FIG. 23 is a diagram of an example format of a single data unit that includes midambles and one or more sets of padding bits, according to an embodiment.

FIG. 23 illustrates an example format of a data packet or unit 1020 that has a preamble 1022, segmented data payload portions 1025, midambles 1028, and sets of padding bits 1030 that are included in respective data payload portions 1025. The data packet 1020 is an embodiment of the data packet 100 of FIG. 3, for example. The data payload portions 1025a-1025c are of equal lengths, in an embodiment, so that $N_{d1}=N_{d2}=N_{d3}$. In other embodiments, at least two of the respective portions are of different lengths, e.g., $N_{d1}$ is not equal to $N_{d2}$, or $N_{d1}$ is not equal to $N_{d2}$ and $N_{d2}$ is not equal to $N_{d3}$. The sets of padding bits 1030 may utilize any suitable padding convention, such as padding with zeroes or padding with ones.

In embodiments where the data payload content bits of each data payload segment or portion 1025 are padded separately or on a per-segment basis (such as illustrated in FIG. 23), the number of padding bits 1030 for each data payload segment or portion 1025 is determined independently of the number of padding bits for each of the other data payload segments 1025. Typically, these embodiments with per-segment padding are used when signaling information corresponding to one or more characteristics of data payload segments 1025 is included in the midambles 1028, such as in a SIG field, a SERVICE field, and/or another non-training field. In FIG. 23, the data unit 1020 includes a number of padding bits 1030a appended to the end of the first data payload segment 1025a to generate an integer number $N_{d1}$ OFDM symbols, and the data unit 1020 also includes another number of padding bits 1030c appended to the end of the third data payload segment 1025c to generate an integer number $N_{d3}$ OFDM symbols. In some scenarios, no additional bits are required for padding to the integer number of OFDM symbols, and thus the set of padding bits 1030 is a null set.

In embodiments of the data unit 1020 in which only some but not all of the data payload segments 1025 are desired to be padded, the indication of the presence or absence of padding in a particular data payload segment 1025 is indicated in the preamble 1022 and in each midamble 1028. For example, the preamble 1022 indicates whether or not the first data payload portion 1025a includes explicit padding, and the midamble 1028a indicates whether or not the second data payload portion 1025b includes explicit padding.

In some embodiments of the data unit 1020, the data payload content bits of all data payload segments 1025 are padded as a whole, or continuously. That is, the number of padding bits for the data unit 100 is based on the total number of data content bits across all of the data payload segments 1025, and the set of padding bits is appended only to the last data payload segment (not shown) of the data unit 1020. In these embodiments, padding bits are omitted from all other data payload segments 1025 other than the last data payload segment. Typically, embodiments having continuous padding are used when signaling information corresponding to one or more characteristics of data payload segments 1025 is included only in the preamble 1022 (such as in a SIG field, in a SERVICE field, and/or in another non-training field of the preamble 1022), and is excluded from any of the midambles 1028.

Whether or not padding is applied to the data payload content bits of the data unit 1020 as a whole or on a per-segment basis, padding is performed during PHY layer processing of the data unit 1020 (e.g., by a PHY processing unit), during MAC layer processing (e.g., by a MAC processing unit) of the data unit 1020, or at both the PHY and the MAC layers (e.g., by the MAC processing unit and the PHY processing unit). In an embodiment of the data unit 1020 in which the preamble 1022 indicates a size or length of the data unit 1020 using a number of bytes, padding is performed at the PHY layer. In an embodiment of the data unit 1020 in which the preamble 1022 indicates the size or length of the data unit 1020 using a number of OFDM symbols, padding is performed at both the PHY and the MAC layers.

In an embodiment, all data bits in all segments of a data unit having midambles are encoded continuously using a suitable encoding scheme, such as a binary convolutional code (BCC), and a set of tail bits, such a 6 tail bits or another suitable number of tail bits for decoder converging, is included at the end of the last segment. For example, such an embodiment is utilized when the midambles omit a SIG field, according to an embodiment. As another example, such an embodiment is utilized when all segments are generated according to a single MCS.

In another embodiment, data bits in each segment are encoded separately, and a corresponding set of tail bits (e.g., 6 tail bits or another suitable number of tail bits for decoder converging) is included at the end of each segment.

In an embodiment in which all data bits in all segments of a data unit having midambles are encoded continuously using a suitable encoding scheme, such as a binary convolutional code (BCC), each segment has a same number, $N_d$, of OFDM symbols (except in some circumstances, the last segment), and each segment includes a SERVICE field. In an embodiment, a number, $N_{dbpb}$, of uncoded data bits in each segment, except the last segment, is:

$$N_{dbpb} = N_d \cdot N_{dbps} - N_{service} - N_{es} \cdot N_{tail} \qquad \text{Equation 8}$$

where $N_{dbps}$ is a number of data bits per OFDM symbol, $N_{service}$ is a number of bits in the SERVICE field, $N_{tail}$ is the number of tail bits (e.g., six or another suitable number), and $N_{es}$ is the number of encoders (e.g., BCC encoders) utilized to encode the data in the data unit. If there are L bytes of MAC data in the whole data unit, the number, $N_{blk}$ of segments (or blocks) in the data unit is:

$$N_{blk} = ceil\left(\frac{8 \cdot L}{N_{dbpb}}\right) \qquad \text{Equation 9}$$

where ceil( ) is the ceiling function. Then, the number, $N_{dbplb}$, of data bits in the last block is:

$$N_{dbplb} = 8 \cdot L - (N_{blk}-1) \cdot N_{dbpb} \qquad \text{Equation 10}$$

The number, $N_{symlb}$, of OFDM symbols in the last segment is:

$$N_{symlb} = ceil\left(\frac{N_{dbplb} + N_{service} + N_{es} \cdot N_{tail}}{N_{dbps}}\right) \qquad \text{Equation 11}$$

The total number, $N_{sym}$, of OFDM symbols in the whole data unit is:

$$N_{sym} = (N_{blk}-1) \cdot N_d + N_{symlb} \qquad \text{Equation 12}$$

The number of padding bits in the whole data unit, which are appended to the last segment, is:

$$N_{pad} = N_{symlb} \cdot N_{dbps} - N_{dbplb} - N_{service} - N_{es} \cdot N_{tail} \qquad \text{Equation 13}$$

In an embodiment in which all data bits in all segments of a data unit having midambles are encoded continuously using a suitable encoding scheme, such as a BCC, each segment has a same number, $N_d$, of OFDM symbols (except in some circumstances, the last segment), and only one segment includes a SERVICE field, e.g., the first segment in the data unit. In an embodiment, a number, $N_{dbpfb}$, of uncoded data bits in the first segment (which includes the SERVICE field) is:

$$N_{dbpfb} = N_d \cdot N_{dbps} - N_{service} - N_{es} \cdot N_{tail} \qquad \text{Equation 14}$$

In an embodiment, a number, $N_{dbpb}$, of uncoded data bits in each remaining segment, except the last segment, is:

$$N_{dbpb} = N_d \cdot N_{dbps} - N_{es} \cdot N_{tail} \qquad \text{Equation 15}$$

If there are L bytes of MAC data in the whole data unit, the number, $N_{blk}$, of segments (or blocks) in the data unit is:

$$N_{blk} = 1 + ceil\left(\frac{8 \cdot L - N_{dbpfb}}{N_{dbpb}}\right) \qquad \text{Equation 16}$$

Then, the number, $N_{dbplb}$, of data bits in the last block is:

$$N_{dbplb} = 8 \cdot L - N_{dbpfb} - (N_{blk}-2) \cdot N_{dbpb} \qquad \text{Equation 17}$$

The number, $N_{symlb}$, of OFDM symbols in the last segment is:

$$N_{symlb} = ceil\left(\frac{N_{dbplb} + N_{es} \cdot N_{tail}}{N_{dbps}}\right) \qquad \text{Equation 18}$$

The total number, $N_{sym}$, of OFDM symbols in the whole data unit is given by Equation 12. The number of padding bits in the whole data unit, which are appended to the last segment, is:

$$N_{pad} = N_{symlb} \cdot N_{dbps} - N_{dbplb} N_{es} \cdot N_{tail} \qquad \text{Equation 19}$$

In some embodiments in which a SIG field in the preamble includes a field that indicates the number, $N_{sym}$, of OFDM symbols in the data unit (which in turn indicates a length of the packet), both MAC layer padding and PHY layer padding is utilized. In an embodiment, the number, L, of data bytes in the data unit corresponds to both (i) regular aggregate MAC protocol data unit (A-MPDU) and (ii) padded A-MPDU delimiters to the byte boundary, so that the number, $N_{pad}$, of PHY padding bits is from 0 to 7. In an embodiment, a MAC processing unit, when performing MAC padding, determines how many A-MPDU delimiters are needed to pad to the byte boundary based on determining how much padding is required to fill up the total number, $N_{sym}$, of OFDM symbols in the whole data unit using padding parameters calculations such as described with respect to Equations 8-19, or other suitable padding parameter calculations.

The description of Equations 8-19 assumed that each segment of the data unit has a same number, $N_d$, of OFDM symbols (except in some circumstances, the last segment). In other embodiments, each segment potentially has a different number of OFDM symbols. In light of the present disclosure, Equations 8-19 can be suitably modified in a straightforward manner to reflect implementations in which each segment potentially has a different number of OFDM symbols.

In some embodiments, all data bits in all segments of a data unit having midambles are encoded using a suitable block encoding scheme, such as a low density parity check (LDPC) code, and a set of tail bits, such a 6 tail bits or another suitable number of tail bits for decoder converging, is included at the end of the last segment. For example, such an embodiment is utilized when the midambles omit a SIG field, according to an embodiment. As another example, such an embodiment is utilized when all segments are generated according to a single MCS. In some embodiments, each segment is encoded separately to prevent codewords (e.g., LDPC codewords) from spanning across multiple segments.

In some embodiments utilizing block encoding, a SIG field in the preamble includes a field that indicates the number of bytes in the data unit, which in turn indicates a length of the packet. In some embodiments, each segment of the data unit has a same number, $N_d$, of OFDM symbols (except in some circumstances, the last segment). The number, $N_{pld,pb}$, of information bits in each segment is:

$$N_{pld,pb} = N_d \cdot N_{dbps}.$$

Equation 20

The number, $N_{avbits}$, of available bits in the minimum number of OFDM symbols in which the data field of a segment may fit is:

$$N_{avbits} = N_{CBPS} \cdot m_{stbc} \cdot ceil\left(\frac{N_{pld,pb}}{N_{CBPS} \cdot R \cdot m_{stbc}}\right).$$

Equation 21 where $N_{CBPS}$ is the number of coded bits per OFDM symbol, R is the coding rate, and $m_{stbc}$ is 2 if space-time block coding is used, and 1 otherwise. The number, $N_{CW,pb}$, of LDPC codewords in each segment (except the last segment) and the length, $L_{CW,pb}$, of the LDPC codewords to be used in each segment (except the last segment) is given in table 1, in an embodiment.

TABLE 1

| $N_{avbits}$ | $N_{CW,pb}$ | $L_{CW,pb}$ |
|---|---|---|
| $N_{avbits} \leq 648$ | 1 | 1296, if $N_{avbits} \geq N_{pld,pb} + 912 \cdot (1 - R)$, 648, otherwise |
| $648 < N_{avbits} \leq 1296$ | 1 | 1944, if $N_{avbits} \geq N_{pld,pb} + 1464 \cdot (1 - R)$, 1296, otherwise |
| $1296 < N_{avbits} \leq 1944$ | 1 | 1944 |
| $1944 < N_{avbits} \leq 2592$ | 2 | 1944, if $N_{avbits} \geq N_{pld,pb} + 2916 \cdot (1 - R)$, 1296, otherwise |
| $2592 < N_{avbits}$ | $ceil\left(\frac{N_{pld,pb}}{1944 \cdot R}\right)$ | 1944 |

In other embodiments, $N_{CW,pb}$ and $L_{CW,pb}$ are determined using other suitable techniques, such as according to a rule based only on N avbits instead of based on both $N_{pld,pb}$ and $N_{avbits}$. In other embodiments, $N_{pld,pb}$ is set to If there are L bytes of MAC data in the whole packet, the number, $N_{blk}$, of segments (or blocks) in the data unit is:

$$N_{blk} = ceil\left(\frac{8 \cdot L + N_{SERVICE}}{N_{pld,pb}}\right).$$

Equation 22 assuming one service field for the whole data unit, or $$N_{blk} = ceil\left(\frac{8 \cdot L}{N_{pld,pb} - N_{SERVICE}}\right).$$

Equation 23 assuming one service field per segment. The number, $N_{pld,lb}$, of data bits (excluding service bits) in the last block is:

$$N_{pld,lb} = 8 \cdot L + N_{SERVICE} - (N_{blk} - 1) \cdot N_{pld,pb}$$

Equation 24 assuming one service field for the whole data unit, or:

$$N_{pld,lb} = 8 \cdot L - (N_{blk} - 1) \cdot (N_{pld,pb} - N_{SERVICE}) + N_{SERVICE}$$

Equation 25 assuming one service field per segment. The actual number of bits in any segment is $N_{pld,pb}$ (or $N_{pld,lb}$) minus any required service field bits, according to an embodiment.

In one embodiment utilizing LDPC encoding, the number of shortening/puncturing (if any)/repetition bits for each segment except the last are calculated as specified in the IEEE 802.11n Standard using $N_{pld,pb}$. In the event that the number of puncturing bits requires an extra symbol, the extra symbol is added before the next segment. In this case, there are $N_d+1$ symbols in each segment. In other embodiments, the number of shortening/puncturing (if any)/repetition bits for each segment except the last are calculated using another suitable technique.

In an embodiment, the number, $N_{CW,lb}$, of LDPC codewords in the last segment and the length, $L_{CW,lb}$, of the LDPC codewords to be used in the last segment is recalculated using the same technique described above with respect to $N_{CW,pb}$ and $L_{CW,pb}$. In another embodiment, the codeword length from the previous segments is used as the codeword length for the last segment. Then, the number, $N_{CW,lb}$, of codewords for the last segment is:

$$N_{CW,lb} = floor\left(\frac{N_{pld,lb}}{L_{CW,pb} \cdot R}\right).$$

Equation 26

The number, $N_{avbits,lb}$, of available bits in the minimum number of OFDM symbols in which the data field of the last segment may fit is determined in a manner similar to Equation 21. In one embodiment utilizing LDPC encoding, the number of shortening/puncturing (if any)/repetition bits for the last segment are calculated as specified in the IEEE 802.11n Standard using $N_{pld,lb}$. The number of OFDM symbols in the last segment is:

$$N_{SYM} = \frac{N_{avbits,lb}}{N_{CBPS}}.$$

Equation 27

If there is an extra symbol for the last block, a field of the preamble is utilized to indicate the extra symbol, in an embodiment. In another embodiment, the receiver can determined the exact number of bits in the last segment, and the field in the preamble indicating whether an extra symbol is present is omitted.

In an embodiment, the receiver follows the same processing flow of the transmitter to determine: the number of bits ($N_{pld,pb}$, and $N_{pld,lb}$) based on the total number of bits and the MCS indicated in the SIG field of the preamble; total number of segments ($N_{BLK}$); whether there is an additional symbol for each of the segments based on $N_{pld,pb}$, and $N_{pld,lb}$, so there is no ambiguity regarding additional symbols due to LDPC encoding; codeword boundaries. In an embodiment, the receiver calculates the total duration of the data unit from the above information, which the receiver can utilize for clear channel assessment (CCA) purposes.

In some embodiments, the number, $N_{pld,pb}$, of information bits in each segment is determined differently than Equation 20. In other embodiments, the number, $N_{pld,pb}$, of information bits in each segment is determined according to one of the following equations:

$$N_{pld,pb} = \text{floor}(N_d \cdot N_{dbps}), \qquad \text{Equation 28}$$

$$N_{pld,pb} = \text{ceil}(N_d \cdot N_{dbps}), \qquad \text{Equation 29}$$

$$N_{pld,pb} = \text{floor}\left(\frac{N_d \cdot N_{dbps}}{8}\right) \cdot 8, \qquad \text{Equation 30}$$

$$N_{pld,pb} = \text{floor}\left(\frac{N_d \cdot N_{dbps}}{32}\right) \cdot 32, \qquad \text{Equation 31}$$

$$N_{pld,pb} = N_d \cdot R \cdot N_{CBPS}, \text{ or} \qquad \text{Equation 32}$$

$$N_{pld,pb} = \text{ceil}(N_d \cdot R \cdot N_{CBPS}) \qquad \text{Equation 33}$$

In other embodiments, other suitable rules for specifying $N_{pld,pb}$ are utilized. In some embodiments, different rules for specifying $N_{pld,pb}$ are utilized under different circumstances. For example, in some embodiments, the rule for specifying $N_{pld,pb}$ is conditional based on other parameters associated with the data unit such as an MCS, a number of streams, etc.

In an embodiment, the rule for specifying $N_{pld,pb}$ (e.g., Equations 20, 28-33, etc.) is part of a communication protocol known to both the transmitter and the receiver, and the rule specifies that $N_{pld,pb}$ is determinable based on $N_d$. Because the receiver knows $N_d$, the receiver can determine the boundaries of the midambles without ambiguity. For example, an indication of $N_d$ is included in the preamble (e.g., in the SIG field). As another example, $N_d$ is defined by a communication protocol known by both the transmitter and the receiver.

In an embodiment, rules that define the number of puncturing bits to used as a function of one or more of (i) the MCS, (ii) the number streams, the length of the data unit, etc., are utilized.

In one embodiment, no puncturing is performed, but rather repetition and shortening are utilized.

In some embodiments, techniques similar to those disclosed in Section 20.3.11.6 of the IEEE 802.11n Standard, *The Institute for Electrical and Electronics Engineers*, (2009) are utilized for calculating a number of codewords, the codeword length, the number of symbols, puncturing, etc., in each segment, including the last segment. Section 20.3.11.6 of the IEEE 802.11n Standard, *The Institute for Electrical and Electronics Engineers*, (2009), is hereby incorporated by reference herein. In an embodiment, the codeword length for the last segment is the same as in the previous segment or segments. In another embodiment, the codeword length for the last segment is recalculated based on a number of information bits in the last segment. In an embodiment, the rules also are defined to avoid having extra OFDM symbols due to LDPC encoding. For example, puncturing rules are defined to exclude extra OFDM symbol conditions, in an embodiment.

In other embodiments, techniques similar to those disclosed in U.S. patent application Ser. No. 13/159,143, filed Jun. 13, 2011, entitled "LDPC Coding in a Communication System," are utilized for calculating a number of unshortened codewords, and re-calculation of the number of symbols in each segment, including the last segment. U.S. patent application Ser. No. 13/159,143, filed Jun. 13, 2011, entitled "LDPC Coding in a Communication System," is hereby incorporated by reference herein. In an embodiment, the codeword length for the last segment is the same as in the previous segment or segments. In another embodiment, the codeword length for the last segment is recalculated based on a number of information bits in the last segment.

In some embodiments, the receiver is made aware of the total length of the data unit in terms of the number of OFDM symbols. For example, the number of OFDM symbols is indicated in a field of the preamble, such as the SIG field, in an embodiment. In some embodiments, the receiver is made aware of $N_d$. For example, $N_d$ is indicated in a field of the preamble, such as the SIG field, in an embodiment. As another example, $N_d$ is defined by a communication protocol known by both the transmitter and the receiver.

In some embodiments, techniques similar to those disclosed in Sections 22.3.10.1 and 22.3.10.5 of the IEEE P802.11ac/D2.1 Draft Standard, *The Institute for Electrical and Electronics Engineers*, (2012) are utilized for calculating $N_{pld,pb}$, in each segment, and/or $N_{pld,lb}$. Sections 22.3.10.1 and 22.3.10.5 of the IEEE P802.11ac/D2.1 Draft Standard, *The Institute for Electrical and Electronics Engineers*, (2012), are hereby incorporated by reference herein.

In an embodiment, the transmitter determines $N_{pld,lb}$ based on $N_d$ and the MCS. Then, the transmitter calculates the number of midamble segments, and the number of information bits in the last segment based on $N_{pld,lb}$, and based on the service field length if a service field is included in the last segment, such as described above. For example, the number of information bits in the last segment is calculated according to Equation 24 or Equation 25, in some embodiments. In the last segment, the transmitter uses MAC and/or PHY padding to pad $N_{pld,lb}$ to the nearest OFDM symbol, such as in the IEEE P802.11ac/D2.1 Draft Standard.

The transmitter updates $N_{pld,lb}$:

$$N'_{pld,pb} = D_{BPS} \cdot \text{ceil}(N_{pld,lb} \cdot N_{DBPS}) \qquad \text{Equation 34}$$

$N'_{pld,pb}$ is used to calculate $N_{avbits,lb}$ and the processing flow for the last block is similar to the IEEE P802.11ac/D2.1 Draft Standard. In the event of an extra OFDM symbol, the transmitter sets a value of a field in the preamble (e.g., an "extra field bit" or another suitable field) that indicates whether there is an extra OFDM symbol, in an embodiment. The field indicating whether there is an extra OFDM symbol indicates whether there is an extra OFDM symbol in the last segment, as opposed to any other segment of the data unit, in an embodiment.

In an embodiment, the receiver determines $N_{pld,lb}$ based on $N_d$ and the MCS. The receiver determines the number of OFDM symbols in the last block based on (i) an indication, within the preamble, of the number of OFDM symbols in the data unit, and (ii) the field indicating whether there is an extra OFDM symbol.

The transmitter updates $N_{pld,lb}$:

$$N'_{pld,pb} = N_{DBPS} \cdot \text{ceil}(N_{pld,lb} \cdot N_{DBPS}) \qquad \text{Equation 35}$$

$N'_{pld,pb}$ is used to calculate $N_{avbits,lb}$ and the processing flow for the last block is similar to the IEEE P802.11ac/D2.1 Draft Standard. In the event of an extra OFDM symbol, the transmitter sets a field in the preamble (e.g., an "extra field bit" or another suitable field) to indicate the extra OFDM symbol, in an embodiment. The field indicating the extra OFDM symbol indicates the extra OFDM symbol is in the last segment, as opposed to any other segment of the data unit, in an embodiment. The receiver calculates $N_{pld,lb}$ according to:

$$N_{pld,lb}=N_{lb,init\_sym} \cdot N_{dbps}.$$ Equation 36 where $N_{lb,init\_sym}$ is an initial number of OFDM symbols in the last segment. $N_{lb,init\_sym}$ is calculated in a manner similar to Equation 22-60 in the IEEE P802.11ac/D2.1 Draft Standard, in an embodiment. The receiver uses $N_{pld,lb}$ to process the last segment in a manner described in a manner similar to the processing described in the IEEE P802.11ac/D2.1 Draft Standard, in an embodiment.

In an embodiment, no repetition is performed, but rather shortening and puncturing are utilized. In other embodiments, other encoding techniques described in U.S. patent application Ser. No. 13/159,143 are utilized. For example, techniques described in U.S. patent application Ser. No. 13/159,143 for insuring an integer number of codewords in a data unit (for example, the use of post encoding bits) could be used to ensure an integer number of codewords in each midamble segment. For example, encoded bits are padded with post-encoding bits to a nearest midamble segment boundary, in an embodiment. As another example, techniques similar to techniques describe in U.S. patent application Ser. No. 13/159,143 are utilized to ensure that an initial number of OFDM symbols is equal to $N_d$.

In an embodiment, the preamble includes a field to indicate the type of encoding utilized in the data unit. In an embodiment, the preamble includes a field to indicate whether there is an extra OFDM symbol associated with LDPC encoding. In an embodiment, the SIG field of the preamble includes two bits to separately signal (i) whether the coding type is BCC or LDPC, and (ii) whether there is an extra OFDM symbol for LDPC encoding. In an embodiment, the SIG field of the preamble includes two bits to indicate (i) whether the non-last midamble segment has an extra OFDM symbol for LDPC encoding, and (ii) whether the last midamble segment has an extra OFDM symbol for LDPC encoding. In an embodiment, a field in the preamble (e.g., the SIG field) includes a field that indicates whether the last segment has an extra OFDM symbol for LDPC encoding, whereas the number of symbols in the other segments is capable of being derived at the receiver by running LDPC parameter computations such as described above.

In an embodiment, the last segment is intentionally padded to have the same length as each of the other midamble segments and/or as previous, adjacent midamble segment.

In some embodiments, each segment corresponds to a portion of a PHY service data unit (PSDU). In some embodiments, each segment corresponds to a portion of an A-MPDU. In embodiments in which each segment corresponds to a portion of a PSDU or A-MPDU, MAC and/or PHY padding is added to the last segment, after data bits, to fill in available OFDM symbols in the PHY protocol data unit (PPDU). In some embodiments, the last segment includes less OFDM symbols than other segments.

In some embodiments, each segment corresponds to a respective subframe of an A-MPDU. For example, in an embodiment, each segment includes a respective MPDU of the A-MPDU, a delimiter, and padding. For example, when there are remaining bits left in a segment that cannot accommodate a next A-MPDU subframe, MAC and/or PHY padding is added to fill up the remaining bits, in an embodiment.

Generally, a data packet 100 that includes midambles 108 may include one or more data payload modifications. For example, a data unit or packet 100 may include only one modification, such as only idle periods, only encoding, only scrambling, or only padding. In other embodiments, though, a data unit or packet 100 may include more than one data payload modification, e.g., the data unit or packet 100 includes scrambling and encoding, or the data unit packet 100 includes padding and idle periods. For a data unit or packet 100 that includes two or more data payload modifications, the two or more data payload modifications are each applied to the data payload contents as a whole, in an embodiment. In another embodiment, the two or more data payload modifications are each applied to the data payload contents on a per data payload segment basis. In yet another embodiment, a first modification is applied to the data payload content bits as a whole, and a second modification is applied to the data payload content bits on a per data payload segment basis.

At least some of the various blocks, operations, and techniques described above may be implemented in hardware, a processor executing firmware and/or software instructions, or any combination thereof. For instance, the midamble generator 312 may be implemented in hardware, a processor executing firmware and/or software instructions, or any combination thereof. Similarly, the STS generator 452A and/or the LTS generator 452B may be implemented in hardware, a processor executing firmware and/or software instructions, or any combination thereof. Still similarly, the P matrix mapper 454 may be implemented in hardware, a processor executing firmware and/or software instructions, or any combination thereof. Additionally, the blocks of FIGS. 9 and 10 may be implemented in hardware, a processor executing firmware and/or software instructions, or any combination thereof.

When implemented utilizing a processor executing software or firmware instructions, the software or firmware instructions may be stored in any non-transitory, tangible computer readable storage medium such as a magnetic disk, an optical disk, a RAM or ROM or flash memory, tape drive, etc. The software or firmware instructions may include machine readable instructions stored on a memory or other non-transitory computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for signaling characteristics of a single physical layer (PHY) data unit during transmission of the single PHY data unit between a first communication device and a second communication device over a communication channel, the method comprising:

generating, at the first communication device, a PHY preamble of the single PHY data unit;

generating, at the first communication device, i) a first portion of a data payload of the single PHY data unit, and ii) a second portion of the data payload of the single PHY data unit; and generating, at the first communication device, a PHY midamble of the single PHY data unit, wherein the PHY midamble is to be transmitted subsequent to transmission of the first portion of the data payload and prior to transmission of the second portion of the data payload, and the PHY midamble includes i) an indication of whether an additional midamble in the single PHY data unit follows the second portion of the data payload, and ii) a first length field that specifies a number of Orthogonal Frequency Division Multiplexing (OFDM) symbols in the second portion of the data payload of the single PHY data unit, so that a third communication device can determine a time duration during which the third communication device should not transmit in order to avoid interfering with transmission of the single PHY data unit.

2. The method according to claim 1, wherein the number of OFDM symbols in the second portion of the data payload is one of a plurality of defined numbers of OFDM symbols.

3. The method according to claim 1, wherein generating the second portion of the data payload comprises padding the second portion of the data payload to correspond to an integer of OFDM symbols.

4. The method according to claim 1, further comprising:
generating, at the first communication device, a media access control (MAC) layer field to include an indication of at least one characteristic of a segment of the PHY midamble; and
including, at the first communication device, the MAC header in the data payload.

5. The method of according to claim 4, wherein generating the MAC layer field includes generating a SERVICE field to include the indication of at least one characteristic of the segment of the PHY midamble.

6. The method of according to claim 1, wherein the indication of whether the additional midamble follows the second portion of the data payload is included in a physical layer header of the PHY midamble.

7. The method according to claim 6, wherein the indication of whether the additional midamble follows the second portion of the data payload is included in a signal field in the physical layer header of the PHY midamble.

8. The method according to claim 1, wherein the data payload further includes one or more additional portions, and wherein the method further comprises generating, at the first communication device, a respective midamble to be transmitted immediately prior to transmission of each of the one or more additional portions of the data payload, the respective midamble including a respective indication of at least one characteristic of the each of the one or more additional portions of the data payload.

9. The method according to claim 1, wherein the preamble includes a second length field that specifies a number of OFDM symbols in the first portion of the data payload of the single PHY data unit.

10. A first communication device, comprising:
a network interface device implemented on one or more integrated circuit devices, wherein the network interface device includes:
a media access control (MAC) processing device implemented on the one or more integrated circuit devices, and
a physical layer (PHY) processing device implemented on the one or more integrated circuit devices and coupled to the MAC processing device, wherein the PHY processing device is configured to:

generate a PHY preamble of a single PHY data unit for transmission to a second communication device, generate a first portion of a data payload and a second portion of the data payload of the single PHY data unit, generate a PHY midamble of the single PHY data unit, the PHY midamble including i) a first length field that specifies a number of Orthogonal Frequency Division Multiplexing (OFDM) symbols in the second portion of the data payload, and ii) an indication of whether an additional midamble in the single PHY data unit follow the second portion of the data payload, so that a third communication device can determine a time duration during which the third communication device should not transmit in order to avoid interfering with transmission of the single PHY data unit, and include the PHY midamble between the first portion of the data payload and the second portion of the data payload.

11. The first communication device according to claim 10, wherein the indication of the number of OFDM symbols in the second portion of the data payload is one of a plurality of defined numbers of OFDM symbols.

12. The first communication device according to claim 10, wherein the PHY processing device is further configured to pad the second portion of the data payload to correspond to an integer number of OFDM symbols.

13. The first communication device according to claim 10, wherein an indication of the size of the second portion of the data payload is included in:
a media access control layer (MAC) portion in the second portion of the data payload.

14. The first communication device according to claim 10, wherein the PHY processing device is further configured to generate a plurality of midambles of the single PHY data unit, each midamble of the plurality of midambles to be transmitted prior to transmission of a respective portion of the data payload, and each midamble of the plurality of midambles including a respective indication of a size of the respective portion of the data payload.

15. The first communication device according to claim 10, wherein the preamble includes a second length field that specifies a number of OFDM symbols in the first portion of the data payload of the single PHY data unit.

16. A method for generating a single physical layer (PHY) data unit for transmission between a first communication device and a second communication device over a communication channel, the method comprising:
generating, at the first communication device, a PHY preamble of the single PHY data unit;
generating, at the first communication device, i) a first portion of a data payload of the single PHY data unit, and ii) a second portion of the data payload of the single PHY data unit; and
generating, at the first communication device, a PHY midamble of the single PHY data unit, wherein the PHY midamble is to be transmitted after transmission of the first portion of the data payload and prior to transmission of the second portion of the data payload, and wherein the PHY midamble includes i) an indication of whether an additional midamble in the single PHY data unit follows the second portion of the data payload, and ii) a first length field that specifies a number of Orthogonal Frequency Division Multiplexing (OFDM) symbols in the second portion of the data payload, so that a third communication device can determine a time duration during which the third communication device should not transmit in order to avoid interfering with transmission of the single PHY data unit.

17. The method according to claim 16, wherein generating the preamble further includes generating the preamble to include a second length field that specifies a number of OFDM symbols in the first portion of the data payload of the single PHY data unit.

18. The method according to claim 17, further comprising when the data payload includes one or more other portions of the data payload, generating, at the first communication device, one or more other midambles, each respective midamble of the one or more other midambles to be transmitted prior to a respective portion of the one or more other portions of the data payload, and each respective midamble of the one or more other midambles including an indication of a size of the respective portion of the one or more other portions of the data payload.

19. A first communication device, comprising:
a network interface device implemented on one or more integrated circuit devices, wherein the network interface device includes:
  a media access control (MAC) processing device implemented on the one or more integrated circuit devices, and
  a physical layer (PHY) processing device implemented on the one or more integrated circuit devices and coupled to the MAC processing device, wherein the PHY processing device is configured to:
    generate a PHY preamble of a single PHY data unit for transmission to a second communication device,
    generate a first portion of a data payload and a second portion of the data payload of the single PHY data unit,
    generate a PHY midamble of the single PHY data unit, the PHY midamble including i) an indication of whether or not an additional midamble in the single PHY data unit follows the second portion of the data payload, and ii) a first length field that specifies a number of Orthogonal Frequency Division Multiplexing (OFDM) symbols in the second portion of the data payload, so that a third communication device can determine a time duration during which the third communication device should not transmit in order to avoid interfering with transmission of the single PHY data unit, and
    include the PHY midamble between the first portion of the data payload and the second portion of the data payload.

20. The first communication device of claim 19, wherein the PHY processing device is configured to generate the preamble to include a second length field that specifies a number of OFDM symbols in the first portion of the data payload of the single PHY data unit.

21. The first communication device of claim 19, wherein, when the data payload includes a third portion of the payload, the PHY processing device is configured to generate an additional midamble to be transmitted prior to the third portion of the data payload, and the additional midamble includes an indication of whether a further midamble in the single PHY data unit follows the third portion of the data payload.

* * * * *